US010395792B2

(12) United States Patent
Al-Harthi et al.

(10) Patent No.: US 10,395,792 B2
(45) Date of Patent: *Aug. 27, 2019

(54) NANOCOMPOSITE FILM COMPRISING CELLULOSE AND A CONDUCTIVE NANOFILLER, AND METHOD OF MAKING

(71) Applicant: KING FAHD UNIVERSITY OF PETROLEUM AND MINERALS, Dhahran (SA)

(72) Inventors: Mamdouh Ahmed Al-Harthi, Dhahran (SA); Osamah Awadh Bin-Dahman, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 16/102,337

(22) Filed: Aug. 13, 2018

(65) Prior Publication Data

US 2019/0115118 A1  Apr. 18, 2019

Related U.S. Application Data

(63) Continuation of application No. 15/067,796, filed on Mar. 11, 2016, now Pat. No. 10,090,078.

(Continued)

(51) Int. Cl.
*H01B 1/24* (2006.01)
*C08J 5/18* (2006.01)
(Continued)

(52) U.S. Cl.
CPC ............. *H01B 1/24* (2013.01); *B29C 39/003* (2013.01); *B29D 7/01* (2013.01); *C08J 3/215* (2013.01);
(Continued)

(58) Field of Classification Search
CPC ................. H01B 1/02; H01B 1/20–24; H01B 3/002–006; G02B 2270/121;
(Continued)

(56) References Cited

U.S. PATENT DOCUMENTS 7,976,950 B2   7/2011   Okai et al.
8,585,934 B2   11/2013  Shah
(Continued)

FOREIGN PATENT DOCUMENTS

KR   10-2010-0055766 A    5/2010
KR      10-1209293 B1    12/2012
(Continued)

OTHER PUBLICATIONS

G. Chakraborty, et al., "Activation behavior and dielectric relaxation in polyvinyl alcohol and multiwall carbon nanotube composite films", Solid State Communications, vol. 151, Issue 10, May 2011, pp. 754-758.

(Continued)

*Primary Examiner* — Z. Jim Yang
(74) *Attorney, Agent, or Firm* — Oblon, McClelland, Maier & Neustadt, L.L.P.

(57) ABSTRACT

Nanocomposite films comprising carbon nanotubes dispersed throughout a polymer matrix and further comprising at least two surfaces with differing amounts of carbon nanotubes and differing electrical resistivity values are provided. Nanocomposite films comprising a polymer layer, a conductive nanofiller layer, and a polysaccharide layer having antistatic properties are provided. In particular, nanocomposites comprising polyvinyl alcohol as the polymer, graphene as the conductive nanofiller and starch as the polysaccharide are provided. In addition, processes for forming the nanocomposites, methods for characterizing the (Continued)

nanocomposites as well as applications in or on electrical and/or electronic devices are provided.

7 Claims, 3 Drawing Sheets

Related U.S. Application Data

(60) Provisional application No. 62/280,459, filed on Jan. 19, 2016.

(51) Int. Cl.

| | | |
|---|---|---|
| *H01B 1/04* | (2006.01) | |
| *B29C 39/00* | (2006.01) | |
| *B29D 7/01* | (2006.01) | |
| *C08J 3/215* | (2006.01) | |
| *B29L 7/00* | (2006.01) | |
| *B29K 507/04* | (2006.01) | |
| *B29K 105/16* | (2006.01) | |
| *B29K 29/00* | (2006.01) | |
| *B29C 41/12* | (2006.01) | |
| *B29K 105/00* | (2006.01) | |

(52) U.S. Cl.
CPC ............... *C08J 5/18* (2013.01); *H01B 1/04* (2013.01); *B29C 41/12* (2013.01); *B29K 2029/04* (2013.01); *B29K 2105/0073* (2013.01); *B29K 2105/162* (2013.01); *B29K 2105/167* (2013.01); *B29K 2507/04* (2013.01); *B29K 2995/0005* (2013.01); *B29K 2995/006* (2013.01); *B29L 2007/008* (2013.01); *B32B 2307/21* (2013.01); *C08J 2329/04* (2013.01); *C08J 2403/02* (2013.01); *G02B 2207/121* (2013.01)

(58) Field of Classification Search
CPC ............. B32B 2307/21; C08L 1/00–32; C08L 3/00–20; C08L 5/00–16
See application file for complete search history.

(56) References Cited

U.S. PATENT DOCUMENTS

| | | |
|---|---|---|
| 9,162,896 B2 | 10/2015 | Kranbuehl |
| 9,382,392 B2 | 7/2016 | Al-Harthi |
| 9,899,123 B2 | 2/2018 | Alden |
| 2008/0044651 A1 | 2/2008 | Douglas |
| 2009/0029125 A1 | 1/2009 | Nakahira |
| 2010/0221508 A1 | 9/2010 | Huang |
| 2010/0301278 A1 | 12/2010 | Hirai |
| 2011/0088931 A1 | 4/2011 | Lettow |
| 2011/0135884 A1 | 6/2011 | Lettow |
| 2011/0281070 A1 | 11/2011 | Mittal |
| 2012/0003467 A1 | 1/2012 | Suzuki |
| 2013/0032765 A1 | 2/2013 | Ermolov |
| 2014/0050903 A1 | 2/2014 | Lettow |
| 2014/0203214 A1 | 7/2014 | Hamad |
| 2014/0284083 A1 | 9/2014 | Srinivas |
| 2015/0200037 A1 | 7/2015 | Inoue |
| 2015/0221411 A1 | 8/2015 | Nakamura |
| 2015/0305212 A1 | 10/2015 | Sarto |
| 2015/0368108 A1 | 12/2015 | Sone |
| 2016/0012936 A1 | 1/2016 | Wu |
| 2016/0035456 A1 | 2/2016 | Sauro |
| 2016/0118156 A1 | 4/2016 | Kawaguchi |
| 2016/0133349 A1 | 5/2016 | Cho |
| 2016/0137854 A1 | 5/2016 | Heintz |
| 2016/0276056 A1 | 9/2016 | Stolyarov |
| 2016/0322133 A1 | 11/2016 | Kim |
| 2017/0103826 A1 | 4/2017 | Al-Harth I |
| 2017/0125136 A1 | 5/2017 | Park |
| 2017/0206997 A1 | 7/2017 | Al-Harth I |
| 2017/0229668 A1 | 8/2017 | Stapleton |
| 2017/0345965 A1 | 11/2017 | Seo |

FOREIGN PATENT DOCUMENTS

| | | |
|---|---|---|
| KR | 10-1374273 B1 | 3/2014 |
| KR | 10-1391158 B1 | 5/2014 |

OTHER PUBLICATIONS

Priscilla P. Peregrino, et al., "Thermal and electrical properties of starch-graphene oxide nanocomposites improved by photochemical treatment", Carbohydrate Polymers, vol. 106, Jun. 15, 2014, pp. 305-311.

Yuxi Xu, et al., "Strong and ductile poly(vinyl alcohol)/graphene oxide composite films with a layered structure", Carbon, vol. 47, 2009, pp. 3538-3543.

Xin Zhao, et al., "Enhanced Mechanical Properties of Graphene-Based Poly(vinyl alcohol) Composites", Macromolecules, vol. 43, No. 5, 2010, pp. 2357-2363.

Chen Wang, et al., "Preparation and Characterization of Graphene Oxide/Poly(vinyl alcohol) Composite Nanofibers via Electrospinning", Journal of Applied Polymer Science, 2013, pp. 3026-3032.

Sunil G. Rathod, et al., "Thermal, Mechanical and Dielectric Properties of Poly(vinyl alcohol)/Graphene Oxide Composites", AIP Conference Proceedings, vol. 1591, p. 1769, Apr. 2014 (Abstract only).

Jiajie Liang, et al., "Molecular-Level Dispersion of Graphene into Poly(vinyl alcohol) and Effective Reinforcement of their Nanocomposites", Advanced Functional Materials, vol. 19, 2009, pp. 1-6.

Henry Kuo Feng Cheng, et al., "Poly(vinyl alcohol) Nanocomposites Filled with Poly(vinyl alcohol)—Grafted Graphene Oxide", ACS Applied Materials & Interfaces, vol. 4. 2012, pp. 2387-2394.

Pandele et al., Synthesis, characterization, and in vitro studies of graphene oxide/chitosan-polyvinyl alcohol films, Carbohydrate Polymers, vol. 102, 2014, p. 813-820 (Year: 2014).

Layek et al., Graphene sulphonic acid/chitosan nano biocomposites with tunable mechanical and conductivity properties, Polymer, vol. 53, 2012, p. 2265-2273 (Year: 2012).

Jose et al., Effect of graphene loading on thermomechanical properties of poly(vinyl alcohol)/starch blend, Journal of Applied Polymer Science, p. 41827 (Year: 2015).

NANOCOMPOSITE FILM COMPRISING CELLULOSE AND A CONDUCTIVE NANOFILLER, AND METHOD OF MAKING

CROSS REFERENCE TO RELATED APPLICATIONS

The present application is a Continuation of Ser. No. 15/067,796, now allowed, having a filing date of Mar. 11, 2016, and which claims benefit of priority of U.S. Provisional Application No. 62/280,459, filed Jan. 19, 2016, the entire contents of which are incorporated herein by reference. Further, this application is related to U.S. application Ser. No. 14/877,623, filed on Oct. 7, 2015, now U.S. patent Ser. No. 10/049,784, the entire contents of which are incorporated herein by reference.

BACKGROUND OF THE INVENTION

Technical Field

The present disclosure relates to a nanocomposite film comprising a polymer matrix and conductive carbon nanotubes dispersed in the matrix having a first surface with a first resistivity and a second surface with a second resistivity, a process for producing the nanocomposite film and an electronic device comprising the nanocomposite film. The present disclosure also relates to a nanocomposite film comprising a polymer layer, a polysaccharide layer and a conductive nanofiller layer sandwiched between the polymer layer and the polysaccharide layer, a process for producing the nanocomposite film and an electronic device comprising the electronic film.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

The shortage in petroleum resources and the rapid increase in the usage of non-biodegradable polymers pose a great risk to the environment. Development of polymer composites from biodegradable and renewable materials has attracted wide attention in scientific and technological communities owing to their interesting properties. Polymer composites filled by nanostructures have attracted significant attention as a result of their unique mechanical, electric and optical properties. Nano-scale conductive fillers can create a seamlessly interconnected percolative network within the polymer matrix altering the energy storing and transporting properties of the composite while reinforcing the native polymer and enhancing its mechanical strength.

Polyvinyl alcohol (PVA) is a synthetic, water soluble and biodegradable polymer that has been used in numerous applications including water soluble packaging films, drug delivery, paper coating, textile sizing, etc. PVA is well known for its biocompatibility and non-toxicity. PVA can easily be blended with a wide range of natural polymers and fillers to make biodegradable composites with outstanding properties. PVA has excellent properties such as biocompatibility, barrier properties to gases and liquids, hydrophilicity and chemical resistance [M. I. Baker, S. P. Walsh, Z. Schwartz, and B. D. Boyan, "A review of polyvinyl alcohol and its uses in cartilage and orthopedic applications," J. Biomed Mater. Res. B. Appl. Biomater, vol. 100, no. 5, pp. 1451-7, July 2012.—incorporated herein by reference in its entirety].

Carbon nanotubes (CNTs) have attracted a great interest since they were discovered in 1991 [S. Iijima, "Helical microtubules of graphitic carbon," Nature, vol. 354, no. 6348, pp. 56-58, November 1991.—incorporated herein by reference in its entirety]. They have a cylindrical structure of carbon atoms with excellent mechanical, electrical, thermal, optical and chemical properties. The Young's modulus and the tensile strength of carbon nanotubes are approximately 5 times and 50 times higher than those of steel, respectively. The thermal conductivity of carbon nanotubes is in the range of 1800-200 W/m-K [F. D. S. Marquis and L. P. F. Chibante, "Improving the heat transfer of nanofluids and nanolubricants with carbon nanotubes," JOM, vol. 57, no. 12, pp. 32-43, December 2005.—incorporated herein by reference in its entirety]. In recent years, many studies have been carried out on the preparation and characterization of biopolymer nanocomposites based on CNTs [M. C. Paiva, B. Zhou, K. A. S. Fernando, Y. Lin, J. M. Kennedy, and Y.-P. Sun, "Mechanical and morphological characterization of polymer-carbon nanocomposites from functionalized carbon nanotubes," Carbon N. Y., vol. 42, no. 14, pp. 2849-2854, January 2004; and S.-I. Moon, F. Jin, C. Lee, S. Tsutsumi, and S.-II. Hyon, "Novel Carbon Nanotube/Poly(L-lactic acid) Nanocomposites; Their Modulus, Thermal Stability, and Electrical Conductivity," Macromol. Symp., vol. 224, no. 1, pp. 287-296, April 2005; and W. Chen and X. Tao, "Production and characterization of polymer nanocomposite with aligned single wall carbon nanotubes," Appl. Surf. Sci., vol. 252, no. 10, pp. 3547-3552, March 2006; and J. T. Yoon, Y. G. Jeong, S. C. Lee, and B. G. Min, "Influences of poly(lactic acid)-grafted carbon nanotube on thermal, mechanical, and electrical properties of poly(lactic acid)," Polym. Adv. Technol., vol. 20, no. 7, pp. 631-638, July 2009; and W.-M. Chiu, Y.-A. Chang, H.-Y. Kuo, M.-H. Lin, and H.-C. Wen, "A study of carbon nanotubes/biodegradable plastic polylactic acid composites," J. Appl. Polym. Sci., vol. 108, no. 5, pp. 3024-3030, June 2008; and S. W. Ko, M. K. Hong, B. J. Park, R. K. Gupta, H. J. Choi, and S. N. Bhattacharya, "Morphological and rheological characterization of multi-walled carbon nanotube/PLA/PBAT blend nanocomposites," Polym. Bull., vol. 63, no. 1, pp. 125-134, April 2009; and S. Chen, G. Wu, Y. Liu, and D. Long, "Preparation of Poly(acrylic acid) Grafted Multiwalled Carbon Nanotubes by a Two-Step Irradiation Technique," Macromolecules, vol. 39, no. 1, pp. 330-334, January 2006; and Y.-L. Liu, W.-H. Chen, and Y.-H. Chang, "Preparation and properties of chitosan/carbon nanotube nanocomposites using poly(styrene sulfonic acid)-modified CNTs," Carbohydr. Polym., vol. 76, no. 2, pp. 232-238, March 2009; and F. Mai, Y. Habibi, J.-M. Raquez, P. Dubois, J.-F. Feller, T. Peijs, and E. Bilotti, "Poly(lactic acid)/carbon nanotube nanocomposites with integrated degradation sensing," Polymer (Guildf), vol. 54, no. 25, pp. 6818-6823, November 2013; and J. Jose, S. K. De, M. A. AlMa'adeed, J. B. Dakua, P. A. Sreekumar, R. Sougrat, and M. A. Al-Harthi, "Compatibilizing role of carbon nanotubes in poly(vinyl alcohol)/starch blend," Starch/Stäarke, vol. 66, pp. 1-7, October 2014.—each incorporated herein by reference in its entirety].

Starch is a natural biodegradable polymer and has several benefits such as availability, its low cost compared to synthetic polymers, and its full compostability without leaving any toxic residue [F. Xie, E. Pollet, P. J. Halley, and L.

Avérous, "Starch-based nano-biocomposites," *Prog. Polym. Sci.*, vol. 38, no. 10-11, pp. 1590-1628, October 2013.—incorporated herein by reference in its entirety]. Starch can be used to enhance the properties as well as to decrease the cost of products incorporating it [M. Maiti, B. S. Kaith, R. Jindal, and A. K. Jana, "Synthesis and characterization of corn starch based green composites reinforced with *Saccharum spontaneum* L graft copolymers prepared under microwave and their effect on thermal, physio-chemical and mechanical properties," *Polym. Degrad. Stab.*, vol. 95, no. 9, pp. 1694-1703, September 2010.—incorporated herein by reference in its entirety]. However, the films formed from native starch have certain shortcomings such as brittleness and high water absorption [B. Chatterjee, N. Kulshrestha, and P. N. Gupta, "Electrical properties of starch-PVA biodegradable polymer blend," *Phys. Scr.*, vol. 90, no. 2, p. 025805, February 2015.—incorporated herein by reference in its entirety]. Blends of polyvinyl alcohol with starch have been widely studied in the literature [P. Sreekumar, M. a. Al-Harthi, and S. De, "Reinforcement of starch/polyvinyl alcohol blend using nano-titanium dioxide," *J. Compos. Mater.*, vol. 46, no. 25, pp. 3181-3187, February 2012; and P. A. Sreekumar, M. A. Al-Harthi, and S. K. De, "Effect of glycerol on thermal and mechanical properties of polyvinyl alcohol/starch blends," *J. Appl. Polym. Sci.*, vol. 123, no. 1, pp. 135-142, 2012; and P. A. Sreekumar, M. A. Al-Harthi, and S. K. De, "Studies on compatibility of biodegradable starch/polyvinyl alcohol blends," *Polym. Eng. Sci.*, vol. 52, no. 10, pp. 2167-2172, October 2012; and S. P. Appu, S. K. De, M. J. Khan, and M. A. Al-Harthi, "Natural weather ageing of starch/polyvinyl alcohol blend: effect of glycerol content," *J. Polym. Eng.*, vol. 33, no. 3, pp. 1-7, January 2013.—each incorporated herein by reference in its entirety].

Graphene has a two-dimensional structure of carbon atoms in a hexagonal lattice with sheets having a thickness of just one atom (0.33 nm). The graphene has a layered crystal structure, in which the carbon atoms are strongly bonded on a two-dimensional network consisting of hexagons. Graphene combines the layered structure of clays with the excellent mechanical, thermal and electrical properties of carbon nanotubes to provide unique functional properties in final products. Since the isolation of a single sheet of graphene [K. S. Novoselov, A. K. Geim, S. V Morozov, D. Jiang, Y. Zhang, S. V Dubonos, I. V Grigorieva, a a Firsov, *Science*, vol. 306, no. 5696 (2004) 666-669.—incorporated herein by reference in its entirety], graphene has attracted the attention of researchers pursuing novel nanocomposites. Recently, it has received a substantial interest compared to the conventional nanofillers such as nanoclays and carbon nanotubes because of its exceptional electrical and mechanical properties, high aspect ratio, and low density [O. C. Compton and S. T. Nguyen, "Graphene oxide, highly reduced graphene oxide, and graphene: versatile building blocks for carbon-based materials," *Small*, vol. 6, no. 6, pp. 711-23, March 2010; and S. Sheshmani, A. Ashori, and M. A. Fashapoyeh, "Wood plastic composite using graphene nanoplatelets," *Int. J. Biol. Macromol.*, vol. 58, pp. 1-6, July 2013; and S. Sheshmani and R. Amini, "Preparation and characterization of some graphene based nanocomposite materials," *Carbohydr. Polym.*, vol. 95, no. 1, pp. 348-59, June 2013.—each incorporated herein by reference in its entirety].

Graphene is known to be combined as a few layers (graphite) and different types of graphite nanoplatelets such as thermally expanded graphite, graphene oxide (GO) and chemically modified graphene have been used to make functional polymer nanocomposites [H. Kim, A. Abdala, C. W. Macosko, Macromolecules 43 (2010) 6515; and C. Gómez-Navarro, J. C. Meyer, R. S. Sundaram, A. Chuvilin, S. Kurasch, M. Burghard, K. Kern, U. Kaiser, Nano Lett. 10 (2010) 1144; and J. T. Robinson, F. K. Perkins, E. S. Snow, Z. Wei, P. E. Sheehan, Nano Lett. 8 (2008) 3137; and Y. Zhu, S. Murali, W. Cai, X. Li, J. W. Suk, J. R. Potts, R. S. Ruoff, Adv. Mater. 22 (2010) 3906.—each incorporated herein by reference in its entirety]. The initial development of graphene from graphite was via acid treatment (Hummer's reaction) to exfoliate graphene sheets [W. S. Hummers, R. E. Offeman, J. Am. Chem. Soc. 80 (1958) 1339.—incorporated herein by reference in its entirety].

Making nanocomposites with unique functional properties from polyvinyl alcohol and graphene has attracted significant attention from researchers [Y. Xu, W. Hong, H. Bai, C. Li, and G. Shi, "Strong and ductile poly(vinyl alcohol)/graphene oxide composite films with a layered structure," *Carbon N. Y.*, vol. 47, no. 15, pp. 3538-3543, December 2009; and J. Liang, Y. Huang, L. Zhang, Y. Wang, Y. Ma, T. Guo, and Y. Chen, "Molecular-Level Dispersion of Graphene into Poly(vinyl alcohol) and Effective Reinforcement of their Nanocomposites," *Adv. Funct. Mater.*, vol. 19, no. 14, pp. 2297-2302, July 2009; and H. K. F. Cheng, N. G. Sahoo, Y. P. Tan, Y. Pan, H. Bao, L. Li, S. H. Chan, and J. Thao, "Poly(vinyl alcohol) nanocomposites filled with poly (vinyl alcohol)-grafted graphene oxide," *ACS Appl. Mater. Interfaces*, vol. 4, no. 5, pp. 2387-94, May 2012; and X. Zhao, Q. Zhang, D. Chen, and P. Lu, "Enhanced Mechanical Properties of Graphene-Based Poly(vinyl alcohol) Composites," *Macromolecules*, vol. 43, no. 5, pp. 2357-2363, March 2010; and H.-D. Huang, P.-G. Ren, J. Chen, W.-Q. Zhang, X. Ji, and Z.-M. Li, "High barrier graphene oxide nanosheet/ poly(vinyl alcohol) nanocomposite films," *J. Memb. Sci.*, vol. 409, no. 410, pp. 156-163, August 2012; and C. Wang, Y. Li, G. Ding, X. Xie, and M. Jiang, "Preparation and characterization of graphene oxide/poly(vinyl alcohol) composite nanofibers via electrospinning," *J. Appl. Polym. Sci.*, vol. 127, no. 4, pp. 3026-3032, February 2013; and Y.-S. Ye, M.-Y. Cheng, X.-L. Xie, J. Rick, Y.-J. Huang, F.-C. Chang, and B.-J. Hwang, "Alkali doped polyvinyl alcohol/graphene electrolyte for direct methanol alkaline fuel cells," *J. Power Sources*, vol. 239, pp. 424-432, October 2013; and H.-L. Ma, Y. Zhang, Q.-H. Hu, S. He, X. Li, M. Zhai, and Z.-Z. Yu, "Enhanced mechanical properties of poly(vinyl alcohol) nanocomposites with glucose-reduced graphene oxide," *Mater. Lett.*, vol. 102-103, pp. 15-18, July 2013.—each incorporated herein by reference in its entirety].

For example, Xu et al. reported the preparation of a PVA/graphene oxide nanocomposite that was shown to be strong and ductile in comparison to the pristine polymer. Liang et al. have also prepared PVA/graphene oxide nanocomposites by a simple solution mixing in water and casting method. The molecular level dispersion of graphene (only 0.7 wt. % of graphene oxide) in the polymer matrix significantly improved the mechanical strength properties in comparison to the native polymer.

Furthermore, Cheng et al. used PVA/graphene/graphene oxide instead of pristine graphene oxide alone to further improve the properties of PVA nanocomposites. The results showed a 88% increase in tensile strength, a 150% increase in Young's modulus and a 225% increase in elongation at break compared to the native polymer with only a 1% by weight loading of filler. Zhao et al. prepared a staple dispersion of graphene oxide in water with the aid of sodium dodecyl benzene sulfonate (SDBS) via sonication. The results demonstrated a 150% increase in tensile strength with the addition of 1.8% by weight graphene to the native polymer.

In addition, Huang et al. prepared PVA/graphene oxide nanosheet composites by a simple solution mixing process. A significant change was noted in the barrier property and the results lead to applications in the packaging industry. Wang et al. reported the characterization and preparation of PVA/graphene oxide nanocomposites via electrospinning methods. The results showed a decrease in decomposition temperature as well as a significant increase (42×) in tensile strength with a very low loading (0.02 wt. % of graphene oxide) in the PVA matrix.

Recently, Ye et al. demonstrated significant improvements in ionic conductivity and methanol crossover for a PVA membrane reinforced with graphene leading to fuel cell applications. Ma et al. prepared nanocomposite films of PVA and a glucose-reduced graphene oxide (rGO) by a solution blending method. The aqueous suspension stability of rGO was investigated by adding sodium dodecyl benzene sulfonate (SDBS) and poly(N-vinyl-2-pyrrolidone) (PVP). The results showed that PVP enhanced the dispersion of rGO in water significantly better than SDBS. Furthermore, the results showed an increased tensile strength and an increased Young's modulus for the nanocomposite films compared to the native PVA polymer.

In view of the forgoing, one aspect of the present disclosure is to design and provide nanocomposites with a non-uniform dispersion of carbon nanotubes in a polymeric matrix to introduce non-uniform electrical conductivity. It is envisioned that by this manner nanocomposites having the same or different local and bulk electrical resistivities can be produced. Another aspect of the present disclosure is nanocomposite films comprising a polymer layer, a conductive nanofiller layer, and a polysaccharide layer having antistatic properties at both the polymer layer and the polysaccharide layer. In addition, processes for forming the nanocomposites, methods for characterizing the nanocomposites as well as applications in or on electrical and/or electronic devices are provided.

BRIEF SUMMARY OF THE INVENTION

According to a first aspect, the present disclosure relates to a nanocomposite film comprising i) a polymer matrix, ii) carbon nanotubes having an average outer diameter of 5-75 nm and an average inner diameter of 0.5-50 nm dispersed in the matrix, iii) a first surface having a first content of carbon nanotubes and a first resistivity, and iv) a second surface having a second content of conductive nanofiller and a second resistivity, wherein the second content of carbon nanotubes is greater than or equal to the first content of carbon nanotubes, and wherein the second resistivity is less than or equal to the first resistivity.

In one embodiment, the nanocomposite film comprises up to 25 weight percent of the carbon nanotubes relative to the total weight of the nanocomposite film.

In one embodiment, the nanocomposite film has an average thickness of 0.1-1.0 mm.

In one embodiment, the polymer matrix comprises polyvinyl alcohol.

In one embodiment, the carbon nanotubes are at least one selected from the group consisting of multi walled carbon nanotubes, single walled carbon nanotubes and hybrid nanotubes.

In one embodiment, the nanocomposite film comprises 0.01-0.75 weight percent of the carbon nanotubes relative to the total weight of the nanocomposite film and the first surface is insulating and has a first resistivity of greater than $10^8$ ohm·cm² and the second surface is insulating and has a second resistivity of greater than $10^8$ ohm·cm².

In one embodiment, the nanocomposite film comprises 1.0-7.0 weight percent of the carbon nanotubes relative to the total weight of the nanocomposite film and the first surface is insulating and has a first resistivity of greater than $10^8$ ohm·cm² and the second surface is antistatic and has a second resistivity of $10^4$-$10^8$ ohm·cm².

In one embodiment, the nanocomposite film comprises greater than 7.5 weight percent of carbon nanotubes relative to the total weight of the nanocomposite film and the first surface is insulating and has a first resistivity of greater than $10^8$ ohm·cm² and the second surface is semiconducting and/or conducting and has a second resistivity of less than $10^4$ ohm·cm².

According to a second aspect, the present disclosure relates to a process for forming the nanocomposite film comprising i) sonicating a solution of carbon nanotubes to form a stable dispersion of carbon nanotubes, ii) mixing the dispersion of carbon nanotubes with a solution of polymer to form a reaction mixture, and iii) casting the reaction mixture and drying to form the nanocomposite film.

According to a third aspect, the present disclosure relates to an electronic device comprising the nanocomposite film, wherein the nanocomposite film is present in or on said device.

According to a fourth aspect, the present disclosure relates to a nanocomposite film comprising i) a polymer layer, ii) a conductive nanofiller layer, iii) a polysaccharide layer, iv) a surface of the polysaccharide layer having a first resistivity, and v) a surface of the polymer layer having a second resistivity, wherein the conductive nanofiller layer is sandwiched between and in continuous contact with the polymer layer and the polysaccharide layer, and wherein the second resistivity is less than or equal to the first resistivity.

In one embodiment, the nanocomposite film comprises a weight ratio between the polymer layer and the polysaccharide layer is in the range of 80:20 to 60:10.

In one embodiment, the nanocomposite film comprises up to 25 weight percent of the conductive nanofiller layer relative to the total weight of the nanocomposite film.

In one embodiment, the conductive nanofiller layer comprises graphene in the form of nanosheets having an average longest dimension of 1-75 µm and an average thickness of 0.5-300 nm or in the form of nanoplatelets having an average diameter of 1-75 µm and an average thickness of 0.5-300 nm.

In one embodiment, the polymer layer comprises polyvinyl alcohol.

In one embodiment, the polysaccharide layer comprises starch.

In one embodiment, the nanocomposite film has an average thickness of 0.1-1.0 mm.

In one embodiment, the surface of the polysaccharide layer is antistatic and has a first resistivity in the range of $10^6$-$10^8$ ohm·cm² and the surface of the polymer layer is antistatic and has a second resistivity in the range of $10^6$-$10^8$ ohm·cm².

According to a fifth aspect, the present disclosure relates to a process for forming the nanocomposite film comprising i) sonicating a solution of conductive nanofiller to form a stable dispersion of conductive nanofiller, ii) mixing the dispersion of conductive nanofiller with a solution comprising polymer and polysaccharide to form a reaction mixture, and iii) casting the reaction mixture and drying to form the nanocomposite film.

According to a sixth aspect, the present disclosure relates to an electronic device comprising the nanocomposite film, wherein the nanocomposite film is present in or on said device.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1A:
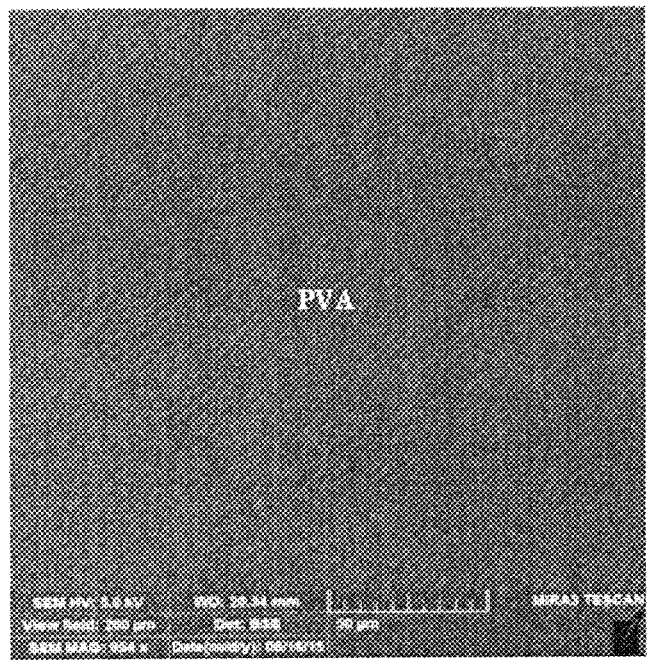
FIG. 1A is a field emission scanning electron microscopy (FESEM) image of a control pure polyvinyl alcohol (PVA) film.

Referring now to the drawings.

According to a first aspect, the present disclosure relates to a nanocomposite film including a polymer matrix and carbon nanotubes dispersed in the matrix.

As used herein, "composite" refers to a combination of two or more distinct constituent materials into one. The individual components, on an atomic level, remain separate and distinct within the finished structure. The materials may have different physical or chemical properties, that when combined, produce a material with characteristics different from the original components. A composite is understood to consist of a bulk phase, termed the matrix, enclosing a reinforcing phase, termed the filler. In a preferred embodiment, the filler is carbon nanotubes.

Nanocomposites are nanomaterials where a nano-object is dispersed into a matrix or phase. A nanocomposite is a multiphase solid material where one of the phases, the nano-object, has one, two or three dimensions of less than 100 nm, or structures having nano-scale repeat distances between the different phases that make up the material. In the broadest sense this definition can include porous media, colloids, gels and copolymers, but is more usually taken to mean the solid combination of a bulk matrix and one or more nanodimensional filler phases differing in properties due to dissimilarities in structure and chemistry. In general, the mechanical, electrical, thermal optical, electrochemical and catalytic properties of the nanocomposite will differ from that of the component materials.

Nanocomposites differ from conventional composite materials due to the exceptionally high surface to volume ratio of the filler phase and/or its exceptionally high aspect ratio. The aspect ratio of a nanofiller (i.e. carbon nanotubes) is defined as the length of the major (long) axis divided by the width of the minor (short) axis. The area of interface between matrix and filler phase or phases is typically an order of magnitude greater than for conventional composite materials.

A polymer nanocomposite is a multiphase system consisting of a polymer or copolymer having nanofillers (i.e. carbon nanotubes) dispersed in the polymer matrix. These nanofillers may be of different shapes and sizes and comprise particles, sheets and/or fibers, but at least one dimension must be in the range of less than 100 nm. Appropriately adding nanomaterial to a polymer matrix can enhance its performance by capitalizing on the nature and properties of the nanoscale filler. This strategy is particularly effective in yielding high performance composites when the properties of the nanoscale filler are substantially different or better than those of the matrix. Nanoscale dispersion of filler or controlled nanostructures into a composite can introduce new physical properties and novel behaviors that are absent in the unfilled matrices, effectively changing the nature of the original matrix.

A polymer is a large molecule, or macromolecule, composed of many repeated subunits. Polymers, both natural and synthetic are created via polymerization of many small molecules, termed monomers. When two or more different monomers unite together to polymerize it is termed a copolymer and the process is termed copolymerization. The consequently large molecular mass of polymers relative to small molecule compounds produce unique physical properties including toughness, viscoelasticity, and a tendency to form semicrystalline structures rather than crystals. The polymer of the polymer matrix of the present disclosure may be a homopolymer (one monomer) or a copolymer (more than one monomer) and mixtures thereof.

Copolymers can be classified based on how their constituent monomeric units are arranged along the chain. Alternating copolymers have regular alternating monomeric units. Periodic copolymers have monomeric units arranged in a repeating sequence. Statistical copolymers have a sequence of monomer residues following a statistical rule. Random copolymers have the probability of finding a given type of monomer unit at a particular point in the chain equal to the mole fraction of that monomer in the chain. Block copolymers comprise two or more homopolymer subunits linked by covalent bonds and may require an intermediate non-repeating subunit or junction block. In gradient copolymers the monomer composition changes gradually along the chain. The polymer of the polymer matrix of the present disclosure may be a homopolymer, an alternating copolymer, a periodic copolymer, a statistical copolymer, a block copolymer, a gradient copolymer or mixtures thereof.

Polymers can be classified based on their origin and occurrence in nature. Polymers which occur in nature are called natural polymers, also known as biopolymers. Examples of such polymers include, but are not limited to natural rubber, natural silk, shellac, amber, cellulose, starch, alginate, chitosan, collagen, keratin, gelatin, fibrin, polypeptides, polysaccharides, nucleic acids, proteins, etc. Semisynthetic polymers are chemically modified natural polymers and include hydrogenated natural rubber, cellulosic, cellulose nitrate, methyl cellulose, etc. A polymer which has been synthesized in a laboratory is known as a synthetic polymer or manmade polymers. Examples of such polymers include synthetic rubber, polyvinyl alcohol, polyethylene, polyethylene glycol, polystyrene, polyvinyl chloride (PVC or vinyl), polypropylene, polyacrylonitrile, polyvinyl burtyral (PVB), polysulfone, polycapro lactone (PCL), polyglycerol sebacate (PGS), poly(lactic-co-glycolic acid), phenol formaldehyde resin (Bakelite), neoprene, nylon, silicone etc. The polymer of the polymer matrix of the present disclosure may be a natural polymer, a semisynthetic polymer or a synthetic polymer or copolymers and mixtures thereof.

Polymers can be classified based on their thermal response. Thermoplastic polymers can be softened or plasticized repeatedly upon the application of thermal energy without much change in properties if treated with certain precautions. Examples of such polymers include polyolefins, nylons, linear polyesters and polyethers, poly(vinyl chloride), sealing wax, etc. Thermosetting polymers undergo certain chemical changes on heating and convert themselves into an infusible mass. The curing or setting process involves chemical reaction leading to further growth and cross linking of the polymer chain molecules and producing giant molecules. Examples of such polymers include phenolic resins, urea, epoxy resins, diene rubbers, etc. The polymer of the polymer matrix of the present disclosure may be a thermoplastic polymer, a thermosetting polymer or copolymers and mixtures thereof.

Polymers can be classified based on their mode of formation. Addition polymers are formed from olefinic, diolefinic, vinyl and related monomers. They are formed from simple addition of monomer molecules to each other in quick succession by a chain mechanism. This process is called addition polymerization. Examples of such polymers include polyethylene, polypropylene, polystyrene. Condensation polymers are formed from intermolecular reactions between bifunctional or polyfunctional monomer molecules having reactive functional groups such as —OH, —COOH, —NH$_2$, —NCO, etc. The polymer of the polymer matrix of the present disclosure may be an addition polymer, a condensation polymer or copolymers and mixtures thereof.

Polymers can be classified based on their structure or line structure. If the monomer units are joined in a linear fashion the polymer is said to be a linear polymer. If the monomer units are joined in a branched manner the polymer is said to be a branched polymer. If the monomer units are joined together in a chain fashion the polymer is said to be a cross linked polymer. A graft copolymer is a special type of branched copolymer where the side chains are structurally distinct from the main chain. The individual chains of a graft copolymer may be homopolymers or copolymers. The polymer of the polymer matrix of the present disclosure may be a linear homopolymer (one monomer), a linear copolymer (more than one monomer), a branched homopolymer, a branched copolymer, a cross linked homopolymer, a cross linked copolymer, a graft copolymer or mixtures and copolymers thereof.

Polymers can be classified based on their application and physical properties depending on the ultimate form and use of the polymer. Rubbers (elastomers) are high molecular weight polymers with long flexible chains and weak intermolecular forces. They typically exhibit tensile strength in the range of 300-3000 psi and elongation at break in the range of 300-1000% and examples include natural and synthetic rubber. Plastics are relatively tough substances with high molecular weight that can be molded with (or without) the application of heat. These are usually much stronger than rubbers. They typically exhibit tensile strength in the range of 4000-15000 psi and elongation at break in the range of 20-200% and examples include polyethylene, polypropylene, poly(vinyl chloride), polystyrene, etc. Fibers are long chain polymers characterized by highly crystalline regions resulting mainly from secondary forces. They have a much lower elasticity than plastics and elastomers. They typically also have high tensile strength ranging between 20,000-150,000 psi, are light weight and possess moisture absorption properties. The polymer of the polymer matrix of the present disclosure may be a rubber, a plastic, a fiber or copolymers and mixtures thereof.

Polymers can be classified based on their tacticity or structure. Tacticity may be defined as the geometric arrangement (orientation) of the characteristic group (side group) of monomer units with respect to the main chain (backbone) of the polymer. An isotactic polymer is the type of polymer in which the characteristic groups are arranged on the same side of the main chain. A syndiotactic polymer is the type of polymer in which the characteristic groups are arranged in an alternating fashion. An atactic polymer is the type of polymer in which the characteristic groups are arranged in irregular fashion (randomness) around the main chain. The polymer of the polymer matrix of the present disclosure may be isotactic, syndiotactic, atactic or copolymers and mixtures thereof.

In a preferred embodiment, the polymer matrix is polyvinyl alcohol (PVA). Polyvinyl alcohol (PVA, PVOH or PVAI) is a water-soluble synthetic polymer. It has the idealized chemical formula $[CH_2CH(OH)]_n$. Polyvinyl alcohol, like most polymers, is an electrical insulator. It is white (colorless) and odorless, exhibits crystallinity and can be supplied as beads or as solutions in water. PVA is biocompatible, non-toxic, resistant to oil, grease and solvents and has a high tensile strength and flexibility. Additionally, PVA has excellent film forming, emulsifying and adhesive properties.

Polyvinyl alcohol (PVA) has a relatively simple chemical structure with a pendant hydroxyl group. Unlike most vinyl polymers, PVA is not prepared by polymerization of the corresponding monomer. The monomer, vinyl alcohol, does not exist in a stable form, but rather rearranges to its tautomer, acetaldehyde. PVA instead is prepared by the polymerization of vinyl acetate to polyvinyl acetate (PVAc), followed by hydrolysis of PVAc to PVA. Other precursor polymers are sometimes used, with formate or chloroacetate groups instead of acetate. The conversion of the polyesters is usually conducted by base-catalyzed transesterification with ethanol. The hydrolysis reaction does not go to completion resulting in polymers with a certain degree of hydrolysis that depends on the extent of the reaction. In essence, PVA is always a copolymer of PVA and PVAc.

Polyvinyl alcohol is an atactic material, defined as a macromolecule where the substituents are placed randomly along the chain. The percentage of meso diads is between 1 and 99%. In terms of microstructure, it is composed mainly of 1,3-diol linkages [—CH$_2$—CH(OH)—CH$_2$—CH(OH)—] but a few percent of 1,2 diols [—CH$_2$—CH(OH)—CH(OH)—CH$_2$—] occur, depending on the conditions for the polymerization of the vinyl ester precursor.

Several properties of the polyvinyl alcohol polymer depend on the amount of residual ester groups. The content of acetate groups, or degree of hydrolysis, has an effect on the chemical properties, solubility and crystallizability of PVA. Residual hydrophobic acetate groups weaken the intra- and intermolecular hydrogen bonding of adjoining hydroxyl groups. Generally, PVA grades with high degrees of hydrolysis have a lower solubility in water and are more difficult to crystallize.

In one embodiment, the polyvinyl alcohol of the present disclosure has a hydrolysis value of at least 60%, preferably at least 65%, preferably at least 70%, preferably at least 75%, preferably at least 80%, preferably at least 85%, preferably at least 90%, preferably at least 91%, preferably at least 92%, preferably at least 93%, preferably at least 94%, preferably at least 95%, preferably at least 96%, preferably at least 97%, preferably at least 98%, preferably at least 99%, where a value of 100% is complete hydrolysis and 0% is no hydrolysis.

Polyvinyl alcohol is produced by free radical polymerization and subsequent hydrolysis resulting in a wide molecular weight distribution. In one embodiment, the polyvinyl alcohol of the present disclosure has an average molecular weight of 5-200 kDa, preferably 10-150 kDa, preferably 10-100 kDa, preferably 10-75 kDa, more preferably 10-50 kDa, preferably 20-35 kDa.

Dispersity is a measure of the heterogeneity of sizes of molecules or particles in a mixture. The polydispersity index (PDI or heterogeneity index) is a measure of the distribution of molecular mass in a given polymer sample. The PDI is calculated as the weight average molecular weight divided by the number average molecular weight. Typically, dispersities vary based on the mechanism of polymerization and can be affected by a variety of reaction conditions such as reactant ratios, how close the polymerization went to completion, etc. Generally, a decreasing molecular weight distribution increases water solubility and increase flexibility. It can further affect properties of PVA including crystallizability, adhesion, mechanical strength and diffusivity. In one embodiment, the polyvinyl alcohol of the present disclosure has a PDI of up to 6, preferably up to 5, preferably up to 3, preferably up to 2.5, preferably up to 2, preferably up to 1.5, preferably up to 1.25.

The degree of polymerization (DP) is defined as the number of monomeric units in a macromolecule or polymer. In one embodiment, the polyvinyl alcohol of the present disclosure has a degree of polymerization of 100-2500, preferably 100-1500, preferably 100-750, preferably 100-300.

General grades of polyvinyl alcohol include ultra-low viscosity (DP<300 and average molecular weight<23 kDa), low viscosity (DP=350-650 and average molecular weight=31-50 kDa), medium viscosity (DP=1000-1500 and average molecular weight=85-124 kDa) and high viscosity (DP=1600-2200 and average molecular weight=146-186 kDa). In the present disclosure, polyvinyl alcohol may refer to PVA that is ultra-low viscosity, low viscosity, medium viscosity, high viscosity or mixtures thereof.

It is envisioned that other polymeric materials may be used in lieu of polyvinyl alcohol as the polymer matrix of the nanocomposite film of the present disclosure. Although the selection of a polymer is not viewed as particularly limiting, the polarity of the polymer should be compatible with the carbon nanotubes. Suitable polymers may be selected from the group including, but not limited to, polyacrylates, acrylics, poly(acrylic acid), poly(acrylonitrile), poly(2-hydroxyethylmethacrylate), sodium polyacrylate, ethylene glycol dimethacrylate, polystyrenes, high impact polystyrene, poly(vinyl pyridine), poly(methyl acrylate), polymethacrylates, poly(methyl methacrylate), polychloroprene, polyacrylamide, poly(N-isopropylacrylamide), poly (tetrafluoroethylene) (PTFE), poly(N-vinyl pyrrolidone), poly(vinyl pyrrolidinone), poly(vinyl pyridine), polyethylenes, low-density poly(ethylene), high-density poly(ethylene), chlorinated polyethylene (CPD), poly(propylene), poly(isobutylene), poly(butylene), polyvinyl chlorides (PVC), polyvinyl chloride acetate, polyacrylonitriles, poly(ethyl acetate), poly (vinyl acetate), polyvinylacetates, polyvinyl acetate phthalate, ethylene vinyl acetates, poly(ethylene glycol), polyphenylene ethers, poly(ethylene vinyl alcohol), poly(vinylidene fluoride), poly(p-phenylenevinylene), poly(benzoxazole), polyphenylenebenzobisoxazole (PBO), polyaryletherketones, poly(ether ether ketones), polyphenylenesulfides, polyamide imides, polyarylates, polyarylsulphones, poly(styrene-co-acrylonitrile), ethyl-vinyl-alcohol copolymers, copolymers of ethylene and 1-alkenes, polybutene-1, polymethylpentene, amorphous poly-alpha-olefins (APAO), terephthalates, polyacetylene, polyethylene oxides, polycycloolefins, polyisoprenes, polystyrene-polyisoprene diblock copolymers, polyamides, poly(ethylene terephthalate), poly(trimethylene terephthalate), poly(butylene terephthalate), polycarbonates, polychlorotrifluoroethylene, polyvinyldifluoride, polyperfluoroalkoxy, poly(ethylene oxide), ethylene oxide copolymers, poly(ethylene imine), poly(dimethyl siloxane), silcones, fluorosilicones, fluoropolymers, polybutadienes, butadiene copolymers, epoxidized natural rubbers, epoxy polymer resins, poly (cis-1,4-isoprene), poly (trans-1,4-isoprene), viton, phenolic resins, acrylic resins, vinylacetate resins, polyurethanes, polyurethane-urea, thermosetting polyimides, thermoplastic polyimides, poly(amic acid), polysulfones, polyetherimides, polyethersulfones, chlorosulfonates, polyoxymethylene, polyphenylene oxide, polyphenylenes, perfluorinatedpolyethylenepropylene, polyvinylidene chloride, fluoropoly (ether-imide), polyolefins, aromatic polyamides (Aramid, para-aramid), polyesters, conducting and conjugated polymers, liquid crystal polymers, liquid crystalline polyesters, vectran, biodegradable thermoplastic polyesters and their copolymers, thermosetting polyesters, unsaturated polyesters, acetals, fluorinated elastomers, rubbers, styrene butadiene rubbers, bismaleimides, copolymer rubbers, styrene-isoprene-styrenes, styrene-butadiene-styrenes, ethylene-propylene, ethylene-propylene-diene monomers (EPDM), nitrile-butadienes, acrylonitrile butadiene styrene (ABS), polyethylene/acrylonitrile butadiene styrene, polycarbonate/acrylonitrile butadiene styrene, nylons, thermoplastic continuous and discontinuous fiber composites, thermosetting continuous and discontinuous fiber composites, specialty polymers, etc. and blends, mixtures, alloys and copolymers thereof.

Intrinsically conducting polymers (ICPs) are organic polymers that conduct electricity. They can have metallic conductivity or can be semiconductors. They offer high electrical conductivity but do not show similar mechanical properties to other available polymers. Their electrical properties can be fine-tuned using the methods of organic synthesis and advanced dispersion techniques.

In one embodiment, it is envisioned that the polymer matrix of the nanocomposite film may be adapted to incorporate an intrinsically conducting polymer. Examples of intrinsically conducting polymers include, but are not limited to, poly(fluorene)s, polyphenylenes, polypyrenes, polyazulenes, polynaphthalenes, poly(acetylene)s (PAC), Poly(p-phenylene vinylene) (PPV), poly(pyrrole)s (PPY), polycarbazoles, polyindoles, polyazepines, polyanilines (PANI), poly(thiophene)s (PT), poly(3,4-ethylenedioxythiophene) (PEDOT), poly(p-phenylene sulfide) (PPS) and copolymers and mixtures thereof.

In one embodiment, the polymer matrix is envisioned to be comprised of polyvinyl alcohol copolymers including, but not limited to, poly(vinyl alcohol-co-ethylene) ethylene, poly(acrylic acid)-co-poly(vinyl alcohol) copolymer, poly (vinyl butyral)-co-poly(vinyl alcohol copolymer, poly(vinyl acetate)-co-poly(vinyl alcohol) copolymer, poly(vinyl chloride)-co-poly(vinyl alcohol) and mixtures thereof.

In one embodiment, the polymer matrix is envisioned to be comprised of polyvinyl alcohol doped with additives including, but no limited to, crosslinkers, defoamers, dispersants, biocides and plasticizers.

In one embodiment, the nanocomposite of the present disclosure includes carbon nanotubes comprising at least one selected from the group consisting of single-walled carbon nanotubes, multi-walled carbon nanotubes, and hybrid nanotubes dispersed in the matrix.

Carbon nanotubes (CNTs) are allotropes of carbon with a cylindrical nanostructure with a significantly large length-to-diameter ratio (up to 100,000, 00:1). These cylindrical carbon molecules have unusual properties, which are valuable for nanotechnology, electronics, optics and other fields of materials science and technology. In particular owing to their extraordinary thermal conductivity and mechanical and electrical properties, carbon nanotubes find applications as additives to various structural materials.

Nanotubes are members of the fullerene structural family. The name refers to their long, hollow structure with the "walls" formed by one-atom-thick sheets of carbon, called graphene. These sheets are rolled at specific and discrete ("chiral") angles, and the combination of the rolling angle and radius determines the nanotube properties. Individual nanotubes naturally align themselves into "ropes" held together by van der Waals forces and pi-stacking. Nanotubes are categorized as single-walled nanotubes (SWNTs) and multi-walled nanotubes (MWNTs).

Single-walled nanotubes typically have a diameter of close to 1 nm and a tube length of up to many millions of times longer. The structure of a single-walled nanotube can be conceptualized by wrapping a one-atom-thick layer of graphite called graphene into a seamless cylinder. In practice, the way the graphene sheet is wrapped is represented by a pair of indices (n, m). The integers n and m denote the number of unit vectors along two directions in the honeycomb crystal lattice of graphene. If m=0, the nanotubes are called zigzag nanotubes, and if n=m, the nanotubes are called armchair nanotubes. Otherwise they are called chiral.

Multi-walled nanotubes consist of multiple rolled layers (concentric tubes) of graphene. There are two models that can be used to describe the structures of multi-walled nanotubes. In the Russian Doll model, sheets of graphite are arranged in concentric cylinders, for example, a single-walled nanotube within a larger single-walled nanotube. In the Parchment model, a single sheet of graphite is rolled in around itself, resembling a scroll of parchment or a rolled newspaper. The interlayer distance in multi-walled nanotubes is close to the distance between graphene layers in graphite. The Russian Doll structure is observed more commonly, its individual shells can be described as SWNTs. Hybrid carbon nanotubes refer to hybrids of MWCNTs and, for example, Silica. They are designed to open the tubes of MWCNTs as a sheet instead of a tube.

In one embodiment, the nanocomposite comprises carbon nanotubes with an average outer diameter of 5-75 nm, preferably 8-60 nm, preferably 10-50 nm, preferably 20-40 nm and an average inner diameter of 0.5-50 nm, preferably 0.75-30 nm, preferably 0.8-20, preferably 1.0-10 nm dispersed in the matrix. In one embodiment, the carbon nanotubes have an average length of 1-100 μm, preferably 2-80 μm, preferably 5-60 μm, preferably 10-50 μm. In one embodiment, the carbon nanotubes have a length to diameter ratio in the range of 100,000:1 to 10:1, preferably 50,000:1 to 50:1, preferably 20,000:1 to 100:1, preferably 10,000:1 to 500:1, preferably 5,000:1 to 1,000:1.

In one embodiment, the carbon nanotubes of the nanocomposite are multi-walled carbon nanotubes. The multi-walled carbon nanotubes can adopt the Russian Doll model or the Parchment model or mixtures thereof.

In one embodiment, the carbon nanotubes of the nanocomposite comprise substantially multi-walled carbon nanotubes. The ratio of MWCNTs to SWCNTs is preferably greater than 2:1, preferably greater than 5:1, preferably greater than 10:1, preferably greater than 15:1, preferably greater than 20:1, preferably greater than 25:1, preferably greater than 50:1, preferably greater than 75:1, and preferably greater than 100:1.

The Brunauer-Emmet-Teller (BET) theory aims to explain the physical adsorption of gas molecules on a solid surface and serves as the basis for an important analysis technique for the measurement of the specific surface area of a material. Specific surface area is a property of solids which is the total surface area of a material per unit of mass, solid or bulk volume, or cross sectional area. In one embodiment, the raw carbon nanotubes of the nanocomposite have a BET surface area of at least 50 m$^2$/g, preferably at least 75 m$^2$/g, preferably at least 100 m$^2$/g, preferably at least 150 m$^2$/g, preferably at least 200 m$^2$/g, preferably at least 250 m$^2$/g, such as for example, 50-300 m$^2$/g, preferably 100-280 m$^2$/g, preferably 150-260 m$^2$/g, preferably 200-240 m$^2$/g.

In addition to single-walled carbon nanotubes and multi-walled carbon nanotubes it is envisaged that the present invention may be adapted to incorporate other types and related structures of carbon nanotubes including, but not limited to, a carbon nanotorus, a carbon nanobud, a 3D macroscopic carbon nanotube architecture, graphenated carbon nanotubes (g-CNTs, nitrogen-doped carbon nanotubes, a carbon peapod, cup-stacked carbon nanotubes, extreme carbon nanotubes and mixtures thereof.

In one embodiment, the carbon nanotubes of the present disclosure are "raw" or lacking any surface functionalization or modifications. In addition, it is envisaged that the present invention may be adapted to incorporate surface functionalized and/or surface modified carbon nanotubes. These surface modifications may be covalent, non-covalent or mixtures thereof. Examples of functional groups on the carbon nanotubes include alcoholic, carboxylic, aldehydic, ketonic and esteric oxygenated functional groups. Alternatively, the carbon nanotubes of the present disclosure may be surface modified with amine functionality or other functionality that is proton absorbing or basic.

In one embodiment, the raw carbon nanotubes may be treated with an acid such as $HNO_3$, HF, HCl and $H_2SO_4$. The acid treatment may affect the pore size and/or surface characteristics of the carbon nanotubes. Alternatively, the raw carbon nanotubes may be treated with a base such as NaOH. The base treatment may affect the pore size and/or surface characteristics of the carbon nanotubes.

As used herein, "impregnated" describes being completely or partially filled throughout, saturated, permeated and/or infused. In one embodiment, the carbon nanotubes of the nanocomposite may be impregnated with nanoparticles, such as metal oxide nanoparticles. The nanoparticles may be affixed inside of and/or on an outer surface of the carbon nanotubes. The nanoparticles may be affixed on one or more surfaces of the carbon nanotubes. The nanoparticles may be affixed to carbon nanotubes in any reasonable manner, such as affixed to one or more surfaces of the carbon nanotubes or alternately, at least partially embedded within the tubular cavity of the carbon nanostructure and/or additional pore spaces. In one embodiment, from 10-90% of the total volume and/or total surface area of the nanoparticles may be embedded within the tubular cavity of the carbon nanotube, preferably 25-80%, preferably 40-60%.

In one embodiment, greater than 10% of the surface area (i.e. surface and pore spaces) of the carbon nanotubes are covered by nanoparticles and preferably greater than 15%, preferably greater than 20%, preferably greater than 25%, preferably greater than 30%, preferably greater than 35%, preferably greater than 40%, preferably greater than 45%, preferably greater than 50%, preferably greater than 55%, preferably greater than 60%, preferably greater than 65%, preferably greater than 70%, preferably greater than 75%, preferably greater than 80%, preferably greater than 85%, preferably greater than 90%, preferably greater than 95%, preferably greater than 96%, preferably greater than 97%, preferably greater than 98%, preferably greater than 99%.

Nanoparticles are particles between 1 and 100 nm in size. A particle is defined as a small object that behaves as a whole unit with respect to its transport and properties. Nanoparticles are named for the real-world shapes that they appear to represent. These morphologies sometimes arise spontaneously as an effect of the synthesis or from the innate crystallographic growth patterns of the materials themselves. Some of these morphologies may serve a purpose, such as bridging an electrical junction. In one embodiment, the nanoparticles of the present disclosure can be synthesized and formed into a variety of morphologies and may refer to nanoparticles, nanocrystals, nanospheres, nanoplatelets, nanowires, nanorods, nanotubes, nanocylinders, nanoboxes, nanostars, tetrapods, nanobelts, nanoflowers, etc. and mixtures thereof.

In one embodiment, it is envisaged that the present invention may be adapted to incorporate carbon nanotubes impregnated with nanoscale metals. Examples of possible metals include, but are not limited to, silver, gold, copper, nickel, iron, aluminum zinc, palladium, platinum, magnesium, zirconium, titanium, vanadium, rhodium, rhenium, uranium, silicon, molybdenum, thorium, chromium, manganese, cerium, germanium, tantalum, lead, cadmium, calcium, antimony, tin, bismuth, cobalt, tungsten, indium, silicone, brass, bronze, white brass, stainless steel and alloys or mixtures thereof.

In one embodiment, the nanocomposite of the present disclosure includes carbon nanotubes impregnated with metal oxide nanoparticles comprising at least one selected from the group consisting of aluminum oxide, iron oxide and zinc oxide. In addition to aluminum oxide, iron oxide and zinc oxide, it is envisaged that the present invention may be adapted to incorporate carbon nanotubes impregnated with other metal oxide nanoparticles as a part of the nanocomposite. Exemplary metal oxides include, but are not limited to, oxides of copper, nickel, magnesium, zirconium, titanium, vanadium, rhodium, rhenium, silicon, molybdenum, thorium, chromium, manganese, cerium, silver, lead, cadmium, calcium, antimony, tin, bismuth, cobalt and tungsten and alloys or mixtures thereof. In one embodiment, the carbon nanotubes may comprise up to 15% metal oxide nanoparticles by weight relative to the total weight of the carbon nanotubes, preferably up to 12%, preferably up to 10% by weight relative to the total weight of the carbon nanotubes. In one embodiment, the nanocomposite comprises carbon nanotubes impregnated with metal oxide nanoparticles with a crystal nanoparticle morphology and an average particle size of 5-40 nm, preferably 10-35 nm, preferably 15-30 nm. In one embodiment, the modification of carbon nanotubes with impregnated metal oxide nanoparticles may increase the BET surface area of the carbon nanotubes by at least 100%, preferably by at least 125%, preferably by at least 150%, preferably by at least 175%, more preferably by at least 200% or within said ranges.

An electrical conductor is an object or type of material that allows the flow of electrical current in one or more directions. Metals, such as copper, typify conductors. Traditionally, most metals are good electrical conductors, most non-metals are not. In metals, the movable charged particles are electrons, but positive charges may also be mobile. Conductor implies that the outer electrons of the atoms are loosely bound and free to move through the material.

A semiconductor material has an electrical conductivity value falling between that of a conductor and an insulator. Semiconducting materials exist in two types, elemental materials and compound materials. The properties of a semiconductor rely on the unique arrangement of the crystal lattice and the movement of electrons and holes within the crystal lattice. Current conduction in a semiconductor occurs through the movement of free electrons and "holes", known collectively as charge carriers. Adding impurity atoms to a semiconducting material ("doping") can greatly increase the number of charge carriers within it.

An antistatic material or dissipative material is one which prevents, inhibits, eliminates, or reduces the accumulation of static electricity. In antistatic or dissipative materials the initial charges are suppressed (antistatic) or there is no or low initial charges (dissipative) and discharge to or from human contact is prevented. They represent a slight or minimum amount of conductivity that prevents the buildup of electric charge by dissipating or promoting the decay of the static electricity.

An electrical insulator is a material whose internal electric charges do not flow freely, and therefore make it very hard to conduct an electric current under the influence of an electric field. Most non-metallic solids are said to be good insulators, having very high resistance to the flow of charge through them. Most atoms hold on to their electrons tightly and are insulators. The property that distinguishes an insulator is its resistivity; insulators have higher resistivity than semiconductors or conductors.

Electrical resistivity (resistivity, specific electrical resistance or volume resistivity) is an intrinsic property that quantifies how strongly a given material opposes the flow of electric current. A low resistivity indicates that a material readily allows the movement of electric charge. Electrical conductivity (specific conductance) is the reciprocal of electrical resistivity, and measures a material's ability to conduct an electric current. As used in the present disclosure, an insulator is a material having a resistivity of greater than $10^8$ ohm·cm$^2$, preferably in the range of $10^8$-$10^{17}$ ohm·cm$^2$, a semiconductor and/or conductor is a material having a resistivity of less than $10^4$ ohm·cm$^2$, preferably less than $0.5 \times 10^4$ ohm·cm$^2$ and a antistatic material is a material having an intermediate resistivity in the range of $10^4$-$10^8$ ohm·cm$^2$, preferably $10^5$-$10^8$ ohm·cm$^2$.

According to its first aspect, the present disclosure relates to a nanocomposite film further including a first surface and a second surface. The first surface has a first content of carbon nanotubes and a first resistivity. The second surface has a second content of carbon nanotubes and a second resistivity. Additionally, the second content of carbon nanotubes is greater than or equal to the first content of carbon nanotubes, and the second resistivity is less than or equal to the first resistivity.

The nanocomposite film of the present disclosure may have various shapes and sizes. In one embodiment, the nanocomposite film may be horizontally oriented with a longitudinal axis. The first surface and second surface may be parallel to each other and the longitudinal axis. The first and second surface may also be opposing across the longitudinal axis and the vertical distance between the first surface and second surface may define the thickness of the nanocomposite film. In one embodiment, the film is double sided and the first and second surface are not adjoining. In terms of the present disclosure, the carbon nanotubes may be oriented parallel to the longitudinal axis, perpendicular to the longitudinal axis, or in orientations that are not exactly parallel or perpendicular to the longitudinal axis.

In a preferred embodiment, the carbon nanotubes of the second surface may be in such a quantity and dispersed in such a manner to effectively form one or more seamlessly interconnected infinite conductive networks. Percolation threshold refers to a mathematical concept related to the formation of long-range connectivity in random systems. Below the threshold a giant connected component does not exist; while above it, there exists a giant component of the order of the system size. In one embodiment, the second surface of the nanocomposite film of the present disclosure has a percolation threshold of less than less 10% carbon nanotubes by weight relative to the total weight of the nanocomposite film, preferably less than 7%, preferably less than 5%, more preferably less than 3%.

As used herein, "surface" refers to the outermost part or most outside layer or boundary of a material, here the nanocomposite film. It includes both a continuous set of points with length and width providing an exterior face to the nanocomposite and also may have a thickness and depth and be described as a layer. A surface, as used herein, is in complete and continuous contact with an external environment of the nanocomposite film of the present disclosure as well as the nanocomposite film itself. In one embodiment, the nanocomposite film of the present disclosure comprises a first and second surface. It is further envisaged that the present disclosure may be adapted to incorporate a third surface, a fourth surface, a fifth surface, etc. or a plurality of surfaces with defined content of carbon nanotubes and defined electrical resistivity.

As used herein, "core" refers to the portion of the nanocomposite that is neither the first surface nor the second surface. The core may have characteristics of the first surface, the second surface, both and/or neither. In a preferred embodiment, the first and second surface form distinct layers with distinct and identifiable interfaces between the two surfaces or each surface and the nanocomposite core. In one embodiment, the first and second surfaces form distinct layers, although the interface between the two surfaces or each surface and the nanocomposite core is a mixture of both the first and second surface, a mixture of the first surface and the nanocomposite core, a mixture of the second surface and the nanocomposite core, or a mixture of the first surface, the second surface and the nanocomposite core. The nanocomposite film described herein is singular comprising a first surface, a second surface, a core and their interfaces. The film is not formed by conjoining multiple films and has no internal film-to-film interfaces.

In one embodiment, the core of the nanocomposite film may have a carbon nanotube content gradient. Generally, the core will have a content of carbon nanotubes greater than the first surface and less than the second surface. In one embodiment, the content of the carbon nanotubes in the core may increase at greater distances from the first surface and smaller distances towards the second surface. Conversely, the content of carbon nanotubes in the core may decrease at greater distances from the second surface and smaller distances towards the first surface.

In one embodiment, the nanocomposite film has up to 25% carbon nanotubes by weight relative to the total weight of the nanocomposite film, preferably up to 20%, preferably up to 15%, preferably up to 10%, preferably up to 9%, preferably up to 8%, preferably up to 7%, preferably up to 6%, preferably up to 5%, preferably up to 4%, preferably up to 3%, preferably up to 2%, preferably up to 1%, preferably up to 0.75%, preferably up to 0.5%, preferably up to 0.25%, preferably up to 0.2%, preferably up to 0.15%, preferably up to 0.1%, preferably up to 0.01%.

In one embodiment, the nanocomposite film is at least 75% polymer matrix by weight relative to the total weight of the nanocomposite film, preferably at least 80%, preferably at least 85%, preferably at least 90%, preferably at least 91%, preferably at least 92%, preferably at least 93%, preferably at least 94%, preferably at least 95%, preferably at least 96%, preferably at least 97%, preferably at least 98%, preferably at least 99%, preferably at least 99.5%, preferably at least 99.75%.

In one embodiment, the first surface has less than 50% of the total mass of carbon nanotubes in the nanocomposite film, preferably less than 40%, preferably less than 30%, preferably less than 25%, preferably less than 20%, preferably less than 15%, preferably less than 10%, preferably less than 5%.

In one embodiment, the second surface has greater than 50% of the total mass of carbon nanotubes in the nanocomposite film, preferably greater than 60%, preferably greater than 70%, preferably greater than 75%, preferably greater than 80%, preferably greater than 85%, preferably greater than 90%, preferably greater than 95%.

In one embodiment, the nanocomposite film of the present disclosure has a total average thickness of 0.1-1.0 mm, preferably 0.2-0.8 mm, preferably 0.3-0.7 mm, preferably 0.4-0.6 mm or about 0.5 mm.

In one embodiment, the first surface of the present disclosure may encompass up to 70% of the total thickness of the nanocomposite film, preferably up to 60%, preferably up to 50%, preferably up to 40%, preferably up to 30%, preferably up to 25%, preferably up to 20%, preferably up to 15%, preferably up to 10%, preferably up to 5% of the total thickness of the nanocomposite film.

In one embodiment, the first surface of the present disclosure has a total average thickness of up to 0.5 mm, preferably up to 0.4 mm, preferably up to 0.3 mm, preferably up to 0.25 mm, preferably up to 0.2 mm, preferably up to 0.15 mm, preferably up to 0.1 mm, preferably up to 0.05 mm.

In one embodiment, the second surface of the present disclosure may encompass up to 70% of the total thickness of the nanocomposite film, preferably up to 60%, preferably up to 50%, preferably up to 40%, preferably up to 30%, preferably up to 25%, preferably up to 20%, preferably up to 15%, preferably up to 10%, preferably up to 5% of the total thickness of the nanocomposite film.

In one embodiment, the second surface of the present disclosure has a total average thickness of up to 0.5 mm, preferably up to 0.4 mm, preferably up to 0.3 mm, preferably up to 0.25 mm, preferably up to 0.2 mm, preferably up to 0.15 mm, preferably up to 0.1 mm, preferably up to 0.05 mm.

The mechanical properties of the nanocomposite film of the present disclosure are also of interest. Tensile strength is the maximum stress that a material can withstand while being stretched or pulled before failing or breaking. Young's modulus (tensile modulus, E-modulus or elastic modulus) is a measure of a material's stiffness or its resistance to being deformed elastically (non-permanently) when a force is applied and can be thought of as the ratio of stress to strain. In one embodiment, the nanocomposite film of the present disclosure has a tensile strength in the range of 5-75 MPa, more preferably 10-60 MPa, more preferably 15-50 MPa. The inclusion of carbon nanotubes may increase the tensile strength by at least 20%. In one embodiment, the nanocomposite film of the present disclosure has a Young's modulus in the range of 2-80 MPa, preferably 10-70 MPa, preferably 15-60 MPa, more preferably 20-50 MPa. The inclusion of carbon nanotubes may increase the tensile strength by at least 15%.

In one embodiment, the nanocomposite film comprises from 0.01-0.75% carbon nanotubes by weight relative to the total weight of the nanocomposite film, preferably 0.01-0.7%, preferably 0.01-0.60%, preferably 0.01-0.50%, preferably 0.01-0.40%, preferably 0.01-0.30%, preferably 0.01-0.25% by weight relative to the total weight of the nanocomposite film.

In one embodiment, the nanocomposite film has a first surface that is insulating and a second surface that is insulating. The first surface is insulating and has a first resistivity of greater than $10^8$ ohm·cm$^2$, preferably greater than $1.25 \times 10^8$, preferably greater than $1.5 \times 10^8$, preferably greater than $1.75 \times 10^8$, preferably greater than $2.0 \times 10^8$, preferably greater than $2.5 \times 10^8$, preferably greater than $3 \times 10^8$, preferably greater than $3.5 \times 10^8$, preferably greater than $4.0 \times 10^8$, preferably greater than $5.0 \times 10^8$ ohm·cm$^2$. The second surface is insulating and has a second resistivity of greater than $10^8$ ohm·cm$^2$, preferably greater than $1.25 \times 10^8$, preferably greater than $1.5 \times 10^8$, preferably greater than $1.75 \times 10^8$, preferably greater than $2.0 \times 10^8$, preferably greater than $2.5 \times 10^8$, preferably greater than $3 \times 10^8$, preferably greater than $3.5 \times 10^8$, preferably greater than $4.0 \times 10^8$, preferably greater than $5.0 \times 10^8$ ohm·cm$^2$.

In one embodiment, the nanocomposite film comprises from 1.0-7.0% of carbon nanotubes by weight relative to the total weight of the nanocomposite film, preferably 1.0-6.0%, preferably 1.0-5.0%, preferably 1.0-4.0%, preferably 1.0-3.5%, preferably 1.0-3.0%, preferably 1.0-2.5%, preferably 1.0-2.25%, preferably 1.0-2.0% by weight relative to the total weight of the nanocomposite film.

In one embodiment, the nanocomposite film has a first surface that is insulating and a second surface that is antistatic. The first surface is insulating and has a first resistivity of greater than $10^8$ ohm·cm$^2$, preferably greater than $1.25 \times 10^8$, preferably greater than $1.5 \times 10^8$, preferably greater than $1.75 \times 10^8$, preferably greater than $2.0 \times 10^8$, preferably greater than $2.5 \times 10^8$, preferably greater than $3 \times 10^8$, preferably greater than $3.5 \times 10^8$, preferably greater than $4.0 \times 10^8$, preferably greater than $5.0 \times 10^8$ ohm·cm$^2$. The second surface is antistatic and has a second resistivity of $10^4$-$10^8$ ohm·cm$^2$, preferably $10^4$-$10^7$, preferably $10^4$-$10^6$, preferably $10^4$-$7.5 \times 10^5$, preferably $10^4$-$5.0 \times 10^5$, preferably $10^4$-$2.5 \times 10^5$, preferably $10^4$-$10^5$, preferably $10^4$-$0.5 \times 10^5$, preferably $10^4$-$0.25 \times 10^5$ ohm·cm$^2$.

In one embodiment, the nanocomposite film comprises greater than 7.5% carbon nanotubes by weight relative to the total weight of the nanocomposite film, preferably greater than 8.0%, preferably greater than 8.5%, preferably greater than 9%, preferably greater than 9.5%, preferably greater than 9.75%, preferably greater than 10% by weight relative to the total weight of the nanocomposite film.

In one embodiment, the nanocomposite film has a first surface that is insulating and a second surface that is semiconducting and/or conducting. The first surface is insulating and has a first resistivity of greater than $10^8$ ohm·cm$^2$, preferably greater than $1.25 \times 10^8$, preferably greater than $1.5 \times 10^8$, preferably greater than $1.75 \times 10^8$, preferably greater than $2.0 \times 10^8$, preferably greater than $2.5 \times 10^8$, preferably greater than $3 \times 10^8$, preferably greater than $3.5 \times 10^8$, preferably greater than $4.0 \times 10^8$, preferably greater than $5.0 \times 10^8$ ohm·cm$^2$. The second surface is semiconducting and/or conducting and has a second resistivity of less than $10^4$ ohm·cm$^2$, preferably less than $7.5 \times 10^3$, preferably less than $5.0 \times 10^3$, preferably less than $4.0 \times 10^3$, preferably less than $3.5 \times 10^3$, preferably less than $3.0 \times 10^3$, preferably less than $2.5 \times 10^3$, preferably less than $2.0 \times 10^3$, preferably less than $1.5 \times 10^3$, preferably less than $1.0 \times 10^3$, preferably less than $0.75 \times 10^3$, preferably less than $0.5 \times 10^3$ ohm·cm$^2$.

Thus, the nanocomposite film of the present disclosure may be insulating in the bulk or at one surface but additionally present an antistatic, semiconducting and/or conducting surface. Thus, a single material is presented that can fulfill the function of both an electrical insulator and an electrical semiconductor and/or conductor depending on which surface is engaged.

According to a second aspect, the present disclosure relates to a process for forming the polymer and carbon nanotube nanocomposite films of the present disclosure, in one or more of their embodiments.

In a preferred embodiment, the polymer and carbon nanotube nanocomposite film of the present disclosure is formed by a solution processing or solution mixing and casting technique. The process is described as wet chemistry and is considered simple and cost effective compared to other processes for manufacturing polymer nanocomposites. In general, solution processing refers to the dispersion of conductive carbon nanotubes into a solvent followed by mixing with a polymer solution and subsequent vaporization of the solvent to form the desired nanocomposite.

In one embodiment, the solution processing begins with dispersion of the carbon nanotubes into a liquid solution by energetic mixing. The certain amount of carbon nanotubes is determined by the desired weight percent of the final nanocomposite. In one embodiment, the ratio of polymer matrix to carbon nanotubes may be 85:1, 90:1, 93:1, 95:1, 97:1, 99:1, 99.5:1, 99.75:1. This mixing may include, but is not limited to, mechanical mixing, magnetic agitation, mild sonication, high-energy ultrasonication, shear mixing, refluxing and mixtures thereof. The process of mixing to form a stable dispersion may last as little as 2 hours, preferably 1.5 hours, preferably 1 hour, preferably 30 minutes, preferably 15 minutes, preferably 10 minutes, preferably 5 minutes. In one embodiment, the dispersion of carbon nanotubes may occur directly in a polymeric solution, in another embodiment the carbon nanotubes are dispersed in a solvent and then mixed with an independent polymer solution that may be in the same solvent or a different solvent.

In one embodiment, once combined in a reaction mixture the dispersed carbon nanotube solution and the polymer solution are further mixed by the means discussed previously, preferably heating, magnetic agitation and ultrasonication, preferably magnetic stirring at 400-1000 rpm, preferably 500-800 rpm, preferably 550-650 rpm or about 600 rpm. In one embodiment the reaction mixture is mixed at elevated temperature of at least 40° C., preferably at least 60° C., preferably at least 70° C., preferably at least 80° C. The process of mixing the reaction mixture may last as little as 2 hours, preferably 1.5 hours, preferably 1 hour, preferably 30 minutes, preferably 15 minutes. In one embodiment, following the mixing the reaction mixture is degassed to remove any traces of air from the solution with inert gas. The process of degassing may last as little as 2 min, preferably 5 min, preferably 10 min, preferably 15 min. Finally, the mixture is poured on a leveled flat surface and allowed to dry at room temperature. The dried films may then be peeled from the surface they were poured and cast on and kept in a desiccator to avoid moisture uptake. In one embodiment, the nanocomposite films are cast and dried in plastic petri dishes. In one embodiment, the drying is done at elevated temperature up to 200° C., preferably up to 150° C., preferably up to 100° C., preferably up to 75° C., preferably up to 50° C. The drying may also be performed at room temperature of 20-40° C., preferably 25-30° C. The drying time may take up to 160 hours, preferably up to 100 hours, preferably up to 80 hours, preferably up to 60 hours, preferably up to 48 hours, preferably up to 24 hours, preferably up to 12 hours, preferably up to 8 hours, preferably up to 4 hours, preferably up to 2 hours.

The nature of the carbon nanotube/polymer ratio and fabrication conditions including, but not limited to temperatures, sonications, step durations and casting and drying conditions are what allow for control of the size, shape and non-uniform dispersion of the carbon nanotubes in the nanocomposite film. Thus, variations in the above process give rise to a nanocomposite film comprising a first surface and a second surface. The first surface has a first content of carbon nanotubes and a first resistivity. The second surface has a second content of carbon nanotubes and a second resistivity. The second content of carbon nanotubes is greater than or equal to the first content of carbon nanotubes, and the second resistivity is less than or equal to the first resistivity In one embodiment, the polymerization by solution processing is carried out in a liquid solvent that may include polar protic solvents, aprotic polar solvents and non-polar solvents. Suitable polar protic solvents may include, but are not limited to, water, nitromethane, and short chain alcohols such as methanol, ethanol, propanol, isopropanol, butanol of the like and mixtures thereof. Suitable aprotic polar solvents may include, but are not limited to, propylene carbonate, ethylene carbonate, butyrolactone, acetonitrile, benzonitrile, nitromethane, nitrobenzene, sulfolane, dimethylformamide, N-methylpyrrolidone or the like and mixtures thereof. Suitable non-polar solvents may include, but are not limited to, cyclohexane, octane, heptane, hexane, benzene, toluene, xylene, methylene chloride, carbon tetrachloride, diethyl ether or the like and mixtures thereof. In one embodiment, co-solvents may also be used. In a most preferred embodiment, the liquid solvent is water.

In one embodiment, the reaction mixture of the present process may contain one or more additional additives to change the properties of the nanocomposites and/or to improve the process of producing the nanocomposites. Exemplary additives include, but are not limited to, surfactants, antifoaming agents or defoamers, a scale inhibitor, a corrosion inhibitor, a colorant, a thermal stabilizer, a dopant, a coolant additive, a polymerization catalyst, a hardener, a Lewis base, a plasticizer and mixtures thereof.

In one embodiment, the nanocomposite film may further undergo one or more manufacturing steps after formation to instill any desired properties. Techniques or processes including, but not limited to, vulcanization, grafting, cross-linking, injection molding, hot pressing, drawing, extrusion, autoclaving, annealing, heat treating, sintering, compression molding, machining, welding, adhesively bonding, thermoforming, coating, vacuum forming, blow molding, stretch blow molding, transfer molding, calendaring, compounding, orienting, tape laying with in situ consolidation, diaphragm forming, rotational molding, centrifugal molding, fiber spinning, filament winding, foam blowing, pultruding and the like are considered to be within the scope of the present method.

In another embodiment, the polymer and carbon nanotube nanocomposite film of the present disclosure is formed by in situ polymerization. In general, the carbon nanotubes are mixed with monomers or pre-polymers and then the nanocomposite is formed by polymerizing the monomers or pre-polymers. This method may further encompass the use of metallocene-based catalyst, anchoring agents such as methylaluminoxane and/or a hardener. This polymerization process is usually accompanied by a viscosity increase that hinders manipulation and limits load fraction. Additionally, solvents may be necessary and may need to be removed, similarly to solution processing.

In another embodiment, the polymer and carbon nanotube nanocomposite film of the present disclosure is formed by melt blending. This method is generally applied to polymers that are insoluble and is particularly useful for dealing with thermoplastic polymers. The technique capitalizes on the fact that thermoplastic polymers soften when heated. Amorphous polymers are heated above their glass transition temperature and semi-crystalline polymers are heated above their melt temperature to induce sufficient softening. Carbon nanotubes can then be mixed into the melt by conventional blending equipment such as shear mixing or a twin screw extruder and bulk samples can be further fabricated by techniques such as compression molding, injection molding, and/or extrusion. In other embodiments, the polymer and carbon nanotube nanocomposite film of the present disclosure is further envisioned to be produced by novel methods including, but not limited to, solid-state mechanochemical pulverization, coagulation spinning and/or latex fabrication methods.

In a preferred embodiment, the polymer matrix is poly-vinyl alcohol). In one embodiment, the carbon nanotubes can be formed by conventional methods known to those of ordinary skill in the art. Techniques have been developed to produce carbon nanotubes in sizable quantities. Exemplary techniques may include, but are not limited to, arc discharge, laser ablation, plasma torch, high pressure carbon monoxide disproportionation, chemical vapor deposition, and super growth carbon vapor deposition. In another embodiment, the nanocomposite film of the present disclosure may be formed by methods requiring a substrate, typically glass or plastic. Such methods include, but are not limited to chemical vapor deposition (CVD), preferably microwave-assisted CVD, and spin coating.

According to a third aspect, the present disclosure relates to an electrical or electronic device including the polymer and carbon nanotube nanocomposite films of the present disclosure, in one or more of their embodiments.

In one embodiment, the electrical or electronic device is covered by the nanocomposite film by attaching the free-standing film to the device by any reasonable manner. The nanocomposite may be attached through surface coating interaction (e.g. glued, tacked, cemented, pasted, etc.), attached by highly connected or integral interactions (e.g. melted together, fused, amalgamated, etc.), or sandwiched between a plurality of electronic components of the device. In another embodiment, the electrical or electronic device is covered by the nanocomposite film by first applying the carbon nanotube/polymer reaction mixture to the device and then forming the nanocomposite on the device by drying. In another embodiment, the electrical device is covered by, attached to, wrapped or enclosed by a metal or alloy or ceramic substrate on which the nanocomposite is disposed.

In one embodiment, the nanocomposite film of the present disclosure may be transparent and find use as a transparent conductive film in photovoltaic cells, liquid crystal displays and touch panel devices. In another embodiment, the unique non-uniform electrical storage characteristics of the nanocomposite film of the present disclosure may find use in supercapacitors, $Li-O_2$ batteries, or Li-ion batteries.

In one embodiment, the nanocomposite film of the present disclosure is envisioned to find use as an electromagnetic shielding material. Electromagnetic (EM) shielding is the practice of reducing the electromagnetic field in a space by blocking the field with barriers made of conductive materials. Shielding is typically applied to enclosures for isolating electronic devices from the "outside world" and cables to isolate wire from the environment through which the cable runs. The nanocomposite film of the present disclosure may completely enclose an electronic product or a portion of that product and prevent the EM emission from an outside source from deteriorating its electronic performance. Conversely, it may also be used to prevent an external susceptible (electronic items or living organisms) from internal emissions of an instruments' electronic circuitry. In one embodiment, the nanocomposite film of the present invention may be applied to plastics comprising sensitive electronic devices.

Exemplary non-limiting applications of the nanocomposite film as an electromagnetic shielding material include, but are not limited to, an EM shielding gasket, a shielded cable, protection of medical, laboratory and defense equipment from interfering signals including AM, FM, TV, emergency services, dispatch, pagers, cellular, ESMR and PCS, protection for computers and keyboards to prevent passive monitoring, and protection of secure data stored on RFID chips embedded in many devices.

According to a fourth aspect, the present disclosure relates to a nanocomposite film comprising a polymer layer, a conductive nanofiller layer, and a polysaccharide layer, wherein the conductive nanofiller layer is sandwiched between and in continuous contact with the polymer layer and the polysaccharide layer.

The polymer of the polymer layer of the present disclosure may be a homopolymer (one monomer) or a copolymer (more than one monomer) and mixtures thereof. The polymer of the polymer layer of the present disclosure may be a homopolymer, an alternating copolymer, a periodic copolymer, a statistical copolymer, a block copolymer, a gradient copolymer or mixtures thereof. The polymer of the polymer layer of the present disclosure may be a natural polymer, a semisynthetic polymer or a synthetic polymer or copolymers and mixtures thereof. The polymer of the polymer layer of the present disclosure may be a thermoplastic polymer, a thermosetting polymer or copolymers and mixtures thereof. The polymer of the polymer layer of the present disclosure may be an addition polymer, a condensation polymer or copolymers and mixtures thereof. The polymer of the polymer layer of the present disclosure may be a linear homopolymer (one monomer), a linear copolymer (more than one monomer), a branched homopolymer, a branched copolymer, a cross linked homopolymer, a cross linked copolymer, a graft copolymer or mixtures and copolymers thereof. The polymer of the polymer layer of the present disclosure may be a rubber, a plastic, a fiber or copolymers and mixtures thereof. The polymer of the polymer layer of the present disclosure may be isotactic, syndiotactic, atactic or copolymers and mixtures thereof.

In a preferred embodiment, the polymer layer is polyvinyl alcohol (PVA). Polyvinyl alcohol (PVA, PVOH or PVAl) is a water-soluble synthetic polymer. It has the idealized chemical formula $[CH_2CH(OH)]_n$. In one embodiment, the polyvinyl alcohol of the present disclosure has a hydrolysis value of at least 60%, preferably at least 65%, preferably at least 70%, preferably at least 75%, preferably at least 80%, preferably at least 85%, preferably at least 90%, preferably at least 91%, preferably at least 92%, preferably at least 93%, preferably at least 94%, preferably at least 95%, preferably at least 96%, preferably at least 97%, preferably at least 98%, preferably at least 99%, where a value of 100% is complete hydrolysis and 0% is no hydrolysis.

In one embodiment, the polyvinyl alcohol of the present disclosure has an average molecular weight of 5-200 kDa, preferably 10-150 kDa, preferably 10-100 kDa, preferably 10-75 kDa, more preferably 10-50 kDa, preferably 20-35 kDa. In one embodiment, the polyvinyl alcohol of the present disclosure has a PDI of up to 6, preferably up to 5, preferably up to 3, preferably up to 2.5, preferably up to 2, preferably up to 1.5, preferably up to 1.25. In one embodiment, the polyvinyl alcohol of the present disclosure has a degree of polymerization of 100-2500, preferably 100-1500, preferably 100-750, preferably 100-300. In the present disclosure, polyvinyl alcohol may refer to PVA that is ultra-low viscosity, low viscosity, medium viscosity, high viscosity or mixtures thereof. In one embodiment, the polymer layer is envisioned to be comprised of polyvinyl alcohol doped with additives including, but no limited to, crosslinkers, defoamers, dispersants, biocides and plasticizers.

It is envisioned that other polymeric materials may be used in lieu of polyvinyl alcohol as the polymer layer of the nanocomposite film of the present disclosure. Although the selection of a polymer is not viewed as particularly limiting, the polarity of the polymer should be compatible with the conductive nanofiller. Suitable polymers may be selected from the group including, but not limited to, polyacrylates, acrylics, poly(acrylic acid), poly(acrylonitrile), poly(2-hydroxyethylmethacrylate), sodium polyacrylate, ethylene glycol dimethacrylate, polystyrenes, high impact polystyrene, poly(vinyl pyridine), poly(methyl acrylate), polymethacrylates, poly(methyl methacrylate), polychloroprene, polyacrylamide, poly(N-isopropylacrylamide), poly(tetrafluoroethylene) (PTFE), poly(N-vinyl pyrrolidone), poly(vinyl pyrrolidinone), poly(vinyl pyridine), polyethylenes, low-density poly(ethylene), high-density poly(ethylene), chlorinated polyethylene (CPD), poly(propylene), poly (isobutylene), poly(butylene), polyvinyl chlorides (PVC), polyvinyl chloride acetate, polyacrylonitriles, poly(ethyl acetate), poly(vinyl acetate), polyvinylacetates, polyvinyl acetate phthalate, ethylene vinyl acetates, poly(ethylene glycol), polyphenylene ethers, poly(ethylene vinyl alcohol), poly(vinylidene fluoride), poly(p-phenylenevinylene), poly (benzoxazole), polyphenylenebenzobisoxazole (PBO), polyaryletherketones, poly(ether ether ketones), polyphenylenesulfides, polyamide imides, polyarylates, polyarylsulphones, poly(styrene-co-acrylonitrile), ethyl-vinyl-alcohol copolymers, copolymers of ethylene and 1-alkenes, polybutene-1, polymethylpentene, amorphous poly-alpha-olefins (APAO), terephthalates, polyacetylene, polyethylene oxides, polycycloolefins, polyisoprenes, polystyrene-polyisoprene diblock copolymers, polyamides, poly (ethylene terephthalate), poly(trimethylene terephthalate), poly(butylene terephthalate), polycarbonates, polychlorotrifluoroethylene, polyvinyldifluoride, polyperfluoroalkoxy, poly(ethylene oxide), ethylene oxide copolymers, poly(ethylene imine), poly(dimethyl siloxane), silcones, fluorosilicones, fluoropolymers, polybutadienes, butadiene copolymers, epoxidized natural rubbers, epoxy polymer resins, poly (cis-1,4-isoprene), poly (trans-1,4-isoprene), viton, phenolic resins, acrylic resins, vinylacetate resins, polyurethanes, polyurethane-urea, thermosetting polyimides, thermoplastic polyimides, poly(amic acid), polysulfones, polyetherimides, polyethersulfones, chlorosulfonates, polyoxymethylene, polyphenylene oxide, polyphenylenes, perfluorinatedpolyethylenepropylene, polyvinylidene chloride, fluoropoly(ether-imide), polyolefins, aromatic polyamides (Aramid, para-aramid), polyesters, conducting and conjugated polymers, liquid crystal polymers, liquid crystalline polyesters, vectran, biodegradable thermoplastic polyesters and their copolymers, thermosetting polyesters, unsaturated polyesters, acetals, fluorinated elastomers, rubbers, styrene butadiene rubbers, bismaleimides, copolymer rubbers, styrene-isoprene-styrenes, styrene-butadiene-styrenes, ethylene-propylene, ethylene-propylene-diene monomers (EPDM), nitrile-butadienes, acrylonitrile butadiene styrene (ABS), polyethylene/acrylonitrile butadiene styrene, polycarbonate/acrylonitrile butadiene styrene, nylons, thermoplastic continuous and discontinuous fiber composites, thermosetting continuous and discontinuous fiber composites, specialty polymers, etc. and blends, mixtures, alloys and copolymers thereof.

Intrinsically conducting polymers (ICPs) are organic polymers that conduct electricity. They can have metallic conductivity or can be semiconductors. They offer high electrical conductivity but do not show similar mechanical properties to other available polymers. Their electrical properties can be fine-tuned using the methods of organic synthesis and advanced dispersion techniques.

In one embodiment, it is envisioned that the polymer layer of the nanocomposite film may be adapted to incorporate an intrinsically conducting polymer. Examples of intrinsically conducting polymers include, but are not limited to, poly (fluorene)s, polyphenylenes, polypyrenes, polyazulenes, polynaphthalenes, poly(acetylene)s (PAC), Poly(p-phenylene vinylene) (PPV), poly(pyrrole)s (PPY), polycarbazoles, polyindoles, polyazepines, polyanilines (PAM), poly (thiophene)s (PT), poly(3,4-ethylenedioxythiophene) (PEDOT), poly(p-phenylene sulfide) (PPS) and copolymers and mixtures thereof.

In one embodiment, the polymer layer is envisioned to be comprised of polyvinyl alcohol copolymers including, but not limited to, poly(vinyl alcohol-co-ethylene) ethylene, poly(acrylic acid)-co-poly(vinyl alcohol) copolymer, poly (vinyl butyral)-co-poly(vinyl alcohol copolymer, poly(vinyl acetate)-co-poly(vinyl alcohol) copolymer, poly(vinyl chloride)-co-poly(vinyl alcohol) and mixtures thereof.

As used herein, fillers are particles added to materials, such as polymers, to engender advantageous properties to the mixed material. Furthermore, fillers may affect the process by which a material or mixed material is processed, making production more efficient or more facile. In terms of the present disclosure the term "nanofiller" refers to added materials with at least one dimension of less than 100 nm that change the properties of the material to which they are added, or affect the process by which the mixed material is produced or manufactured. The nanofiller of the present invention may be selected from the group including, but not limited to, metallic, metal oxide, metal carbonate, ceramic, polymeric and carbonaceous nanomaterials.

In one embodiment, the nanofiller of the present disclosure may be of any shape that provides desired polymerization activity and desired properties in the resulting polymer/nanofiller nanocomposite. The nanocomposites can be classified according to their nanofillers. One-dimensional nanofillers have one dimension of less than 100 nm, generally thickness. Examples of one-dimensional nanofillers include nanosheets, nanoplatelets, nanolaminas and nanoshells. Two-dimensional nanofillers have two dimensions of less than 100 nm, generally including diameter. Examples of two-dimensional nanofillers include nanotubes, nanofibers and nanowhiskers. Three-dimensional nanofillers have all dimensions of less than 100 nm, and generally encompass isodimensional nanoparticles. Examples of three-dimensional nanofillers include nanoparticles, nanogranules and nanometric silica beads. The nanofiller of the present disclosure may be one-dimensional, two-dimensional, three-dimensional or mixtures thereof.

As used herein, the nanofiller or nanoparticle is defined as a small object that behaves as a whole unit with respect to its transport and properties having at least one dimension of less than 100 nm. Nanoparticles are named for the real-world shapes that they appear to represent. These morphologies sometimes arise spontaneously as an effect of the synthesis or from the innate crystallographic growth patterns of the materials themselves. Some of these morphologies may serve a purpose, such as bridging an electrical junction.

In one embodiment, the nanofiller of the present invention may be synthesized and formed into a variety of morphologies and forms including, but not limited to, nanoparticles, nanosheets, nanoplatelets, nanocrystals, nanospheres, nanowires, nanofibers, nanoribbons, nanorods, nanotubes, nanocylinders, nanogranules, nanowhiskers, nanoflakes, nanofoils, nanopowders, nanoboxes, nanostars, tetrapods, nanobelts, nanoflowers, etc. and mixtures thereof.

Nanofiller and nanocomposite characterization is necessary to establish understanding and control of nanoparticle and nanocomposite synthesis, assembly and application. In one embodiment, the nanofiller and nanocomposite are characterized by at least one technique. In another embodiment, it is envisioned that characterization is done using a variety of other techniques. Exemplary techniques include, but are not limited to, electron microscopy (TEM, SEM), atomic force microscopy (AFM), dynamic light scattering (DLS), X-ray photoelectron spectroscopy (XPS), X-ray fluorescence (XRF), powder X-ray diffraction (XRD), energy-dispersive X-ray spectroscopy (EDX), thermogravimetric analysis (TGA), Fourier transform infrared spectroscopy (FTIR), matrix-assisted laser desorption/ionization time-of-flight mass spectrometry (MALDI-TOF), ultraviolet-visible spectroscopy, Rutherford backscattering spectrometry (RBS), dual polartization interferometry and nuclear magnetic resonance (NMR).

In one embodiment, the nanofiller of the present disclosure is a conductive nanofiller. A conductive nanofiller refers to any nanometer sized material that is, or contains at least one material that is, electronically conductive i.e. has a non-zero flow of internal electric charges.

In one embodiment, the conductive nanofiller is an inexpensive carbonaceous nanomaterial such as carbon black (e.g., furnace black and Ketjen black), active carbon, carbon nanorods, carbon nanotubes, carbon fibers, graphene, graphite, expandable graphite, graphene oxide, exfoliated graphite nanoplatelets, thermally reduced graphene oxide, chemically reduced graphene oxide and mixtures thereof, more preferably graphene, graphite, graphene oxide and mixtures thereof, most preferably graphene.

In a preferred embodiment, the conductive nanofiller is graphene. Graphene is an allotrope of carbon in the form of a two-dimensional, atomic-scale hexagonal lattice in which one atom forms each vertex. Graphene is approximately 200 times stronger than steel by weight and conducts heat and electricity with great efficiency. It is the basic structural element of other allotropes including graphite, charcoal, carbon nanotubes and fullerenes. Carbon nanotubes are formed by rolling up a graphene sheets into a tubular structure and graphite is formed by stacking multiple graphene sheets.

Structurally, graphene is a crystalline allotrope of carbon with 2-dimensional properties. As used herein, graphene is a sheet of six membered carbon rings that do not form a closed surface. Its carbon atoms are densely packed in a regular atomic-scale "chicken wire" (hexagonal) pattern. Each atom has four bonds, one σ-bond with each of its three neighbors and one π-bond that is oriented out of the plane. Graphene's hexagonal lattice can be regarded as two interleaving triangular lattices.

Graphene's stability is due to its tightly packed carbon atoms and each carbon atom in a graphene sheet having a $sp^2$ orbital hybridization and delocalized electrons present at opposite surfaces of the graphene sheet. The $sp^2$ hybridization is a combination of orbitals S, $P_x$ and $P_y$ that constitute the σ-bond, the final $P_z$ electron makes up the π-bond. The π-bonds hybridize together to form the π-band and the π*-band. These bands are responsible for most of graphene's notable electronic properties, via the half-filled band that permits free-moving electrons. Graphene is a zero-gap semiconductor. Graphene is also the only form of carbon (or solid material) in which every atom is available for chemical reaction from two sides (due to the 2D structure).

In one embodiment, the graphene conductive nanofiller of the present disclosure may be present as a one-atom thick (~0.33 nm) single layer, or monolayer. As used herein the monolayer is termed a "nanosheet". In another embodiment, the graphene may be present as a bilayer (two atom thick layer) or trilayer (three atom thick layer). In another embodiment, the graphene of the present disclosure may be present as several stacked graphene layers. Thus, in one embodiment the graphene layer may have a thickness greater than one atom and up to 200 atoms, preferably up to 100 atoms, preferably up to 50 atoms, preferably up to 10 atoms, preferably up to 5 atoms, preferably up to 4 atoms, preferably up to 3 atoms.

In very basic terms graphene could be described as a single, one atom thick layer of the commonly found mineral graphite; as used herein "graphite" is essentially made up of hundreds, preferably thousands of layers of graphene. Graphene nanoplatelets have "platelet" morphology, meaning they have a very thin but wide aspect ratio. As used herein a "nanoplatelet" consists of several sheets of graphene with an overall thickness. In one embodiment, the graphene nanoplatelets overlap one another to form a multilayer structure. The graphene of the conductive nanofiller of the present disclosure may be nanosheet graphene, nanoplatelet graphene, and/or mixtures thereof.

Multilayer graphene is a material consisting of two or more layers of graphene. Multilayer graphene can exist in the AB, or Bernal-stacked form, where half of the atoms lie directly over the center of a hexagon in the lower graphene sheet, and half of the atoms lie over an atom. Multilayer graphene can also exist in the AA form in which the layers are exactly aligned. Multilayer graphene can also be found in a twisted configuration. The graphene of the conductive nanofiller of the present disclosure may be multilayer graphene in the AB form, the AA form, the twisted form and mixtures thereof.

In one embodiment, the graphene nanosheets or nanoplatelets of the present disclosure may have wrinkled and/or rippled morphologies. The height of these wrinkles or ripples from the basal plane of the graphene nanosheets or nanoplatelets may range from less than 0.25 nm to about 5 nm, preferably from 0.3-2.5 nm, preferably from 0.5-2 nm, preferably from 1-1.5 nm. The number and frequency of these wrinkles or ripples can vary depending on the chemical size and structure of the nanosheet or nanoplatelet. In another embodiment, the nanosheets or nanoplatelets may be substantially corrugated leading to substantially increased surface area relative to non-corrugated nanosheets or nanoplatelets of comparable size.

In one embodiment, the graphene nanosheets or nanoplatelets of the present disclosure may form sandwich structures such as a sandwich of graphene-polymer-graphene or polymer-graphene-polymer, and so on to more complex multilayer structures with repeating layers of graphene and polymer layer. In one embodiment, the graphene nanosheets or nanoplatelets of the present disclosure may form sandwich structures such as a sandwich of graphene-polysaccharid-graphene or polysaccharide-graphene-polysaccharide, and so on to more complex multilayer structures with repeating layers of graphene and polysaccharide layer.

In one embodiment, the inter-planar distance of the graphene is less than 10 Å, preferably less than 7.5 Å, preferably less than 5 Å, preferably less than 4 Å, preferably less than 3 Å, preferably less than 2.5 Å, preferably less than 2 Å, preferably less than 1.5 Å, preferably less than 1 Å. In one embodiment, the graphene of the present disclosure is in the form of nanoplatelets or nanosheets having an average thickness of 0.5-300 nm, preferably 1-250 nm, preferably 10-200 nm, preferably 20-150 nm, preferably 25-125 nm, preferably 50-100 nm. In one embodiment, the graphene of the present disclosure is in the form of nanoplatelets or nanosheets having an average diameter or width of 1-75 μm, preferably 2.5-50 μm, preferably 5-45 μm, preferably 10-40 μm, preferably 20-30 μm. In one embodiment, the graphene of the present disclosure is in the form of nanoplatelets or nanosheets having an aspect ratio of 200-2000, preferably 500-1500, more preferably 900-1200. In one embodiment, the graphene of the present disclosure is in the form of nanoplatelets or nanosheets having a surface area in the range of 10-2500 $nm^2$, preferably 25-2000 $nm^2$, more preferably 50-1500 $nm^2$, more preferably 75-1250 $nm^2$, more preferably 100-1000 $nm^2$, more preferably 150-750 $nm^2$, or more preferably 200-500 $nm^2$. In one embodiment, the graphene of the present disclosure is in the form of nanoplatelets or nanosheets having a specific surface area of 2.5-750 $m^2/g$, preferably 5-500 $m^2/g$, preferably 7.5-300 $m^2/g$, preferably 10-150 $m^2/g$, preferably 12-120 $m^2/g$, preferably 15-100 $m^2/g$.

In one embodiment, the graphene comprising the conductive nanofiller of the present disclosure has not been chemically modified, it is pristine graphene and a pure carbonaceous material having a purity of greater than 90%, preferably greater than 95%, preferably greater than 96%, preferably greater than 97%, preferably greater than 98%, preferably greater than 99%. In one embodiment, the graphene comprising the conductive nanofiller of the present disclosure has an oxygen content of less than 5%, preferably less than 4%, preferably less than 3%, preferably less than 2%, preferably less than 1%. In one embodiment, the graphene comprising the conductive nanofiller of the present disclosure has a C/O ratio of at least 10, preferably at least 20, preferably at least 30, preferably at least 40, preferably at least 50, preferably at least 75, preferably at least 100, preferably at least 150, preferably at least 200.

In one embodiment, the graphene comprising the conductive nanofiller of the present disclosure may be chemically modified; graphene is commonly modified with nitrogen and oxygen containing functional groups (e.g. graphene oxide). Exposed carbon on the edges of nanosheets or nanoplatelets often reacts with the atmosphere to form hydroxyls, carboxyls, lactones, pyrones, alcohols, carbonyls, imines and/or amines. These modifications may be covalent, non-covalent or mixtures thereof. Examples of functional groups on graphene include, but are not limited to, alcoholic, carboxylic, aldehydic, ketonic and esteric oxygenated functional groups. Alternatively, the graphene may be chemically modified with amine or imine functionality. Chemical functionalization of the graphene may aid the manufacturing of the graphene polymer polysaccharide nanocomposite or improve the interface between the conductive nanofiller and the polymer layer, the polysaccharide layer or both.

In one embodiment, the graphene comprising the conductive nanofiller of the present invention has been chemically modified such that it has a C/O ratio of less than 10, preferably less than 5, preferably less than 4, preferably less than 3, preferably less than 2. In another embodiment, the graphene comprising the conductive nanofiller of the present invention has been chemically modified such that it has a C/N ratio of less than 50, preferably less than 40, preferably less than 30, preferably less than 20, preferably less than 20.

In one embodiment, it is envisaged that the present invention may be adapted to incorporate nanoscale metals as the conductive nanofiller. Examples of possible metals include, but are not limited to, silver, gold, copper, nickel, iron, aluminum zinc, palladium, platinum, magnesium, zirconium, titanium, vanadium, rhodium, rhenium, uranium, silicon, molybdenum, thorium, chromium, manganese, cerium, germanium, tantalum, lead, cadmium, calcium, antimony, tin, bismuth, cobalt, tungsten, indium, silicone, brass, bronze, white brass, stainless steel and alloys or mixtures thereof.

In one embodiment, it is envisaged that the present invention may be adapted to incorporate nanoscale metal oxides as the conductive nanofiller. Examples of possible metal oxides include, but are not limited to oxides of iron, copper, zinc, magnesium, vanadium, nickel, rhodium, rhenium, molybdenum, thorium, chromium, manganese, cerium, silver, lead, cadmium, calcium, antimony, tin, bismuth, cobalt, tungsten, titanium dioxide (anatase, rutile), alumina ($Al_2O_3$), antimony-tin-oxide (ATO), silica (diatomite, pyrogenic silica, silica fume), ruthenium dioxide ($RuO_2$), bismuth ruthenate ($Bi_2Ru_2O_7$), bismuth iridate ($Bi_2Ir_2O_7$), indium oxide ($In_2O_3$), lanthanum chromite ($LaCr_2O_4$), zirconia ($ZrO_2$), titania, iron oxide, silica-alumina, mica, ferrite and mixtures thereof.

In another embodiment, the conductive nanofiller may be additional inorganic materials such as boehmite, a mineral aluminum oxide hydroxide ($\gamma$-AlO(OH)) orthorhombic dipyramidal crystal. It can be obtained naturally or from chemical synthesis from saturated solutions. In another embodiment, the conductive nanofiller may be metal carbonates including, but not limited to magnesium carbonate, potassium carbonate, sodium carbonate, barium carbonate, calcium carbonate and mixtures thereof.

In one embodiment, it is envisaged that the present invention may be adapted to incorporate nanoscale fillers of natural or synthetic clays as well as phosphates of transition metals as the conductive nanofiller. The nanoscale clays are classified according to their crystalline structures and also to the quantity and position of the ions within their simplest atomic geometric pattern. The most widely used nanoscale clays are phyllosilicates (smectites) having a shell-shaped crystalline structure with nanometer thickness but also include polysilicates and double lamellar hydroxides. Examples of possible nanoclays include, but are not limited to, montmorillonite (MMT), kaolinite, smectite (Talc, Mica, MMT), sepiolite, chlorite, saponite, bentonite, kenyaite, magadiite, kanemite, ilerite, silhydrite, zeolite, fluorohectorite, hydrotalcitc and mixtures thereof.

In one embodiment, it is envisaged that the present invention may be adapted to include nanoscale ceramics as the conductive nanofiller. Representative examples of ceramics include carbides such as silicon carbide (SiC), chromium carbide ($Cr_3C_2$), titanium carbide (TiC), zirconium carbide (ZrC), boron carbide ($B_4C$) and diamond (C), nitrides such as silicon nitrides (SiN, $Si_3N_4$), boron nitride (BN), zirconium nitride (ZrN), niobium nitride (NbN), and titanium nitride (TiN), borides such as titanium boride (TiB), zirconium boride (ZrB), tantalum boride (TaB), vanadium boride ($VB_2$), and lanthanum boride ($LaB_6$) and silicides such as titanium silicide (TiSi), tantalum silicide (TaSi), molybdenum silicide (MoSi), and tungsten silicide ($WSi_2$).

In one embodiment, it is envisaged that the present invention may be adapted to include nanoscale electroceramics as the conductive nanofiller. Representative examples of electroceramics include zirconium barium titanate, strontium titanate (ST), calcium titanate (CT), magnesium titanate (MT), calcium magnesium titanate (CMT), zinc titanate (ZT), lanthanum titanate (TLT), lithium lanthanum titanate (LLT), neodymium titanate (TNT), barium zirconate (BZ), calcium zirconate (CZ), lead magnesium niobate (PMN), lead zinc niobate (PZN), lithium niobate (LN), barium stannate (BS), calcium stannate (CS), layered silicates, magnesium aluminum silicate, magnesium silicate, barium tantalite, titanium dioxide, niobium oxide, sapphire, beryllium oxide, barium titanate, zirconia, silica, zirconium tin titanate and mixtures thereof.

In one embodiment, it is envisaged that the present invention may be adapted to include nanoscale silsesquioxanes as the conductive nanofiller. A silsesquioxane is an organosilicon compound with the empirical formula $RSiO_{3/2}$ where R is hydrogen or an alkyl, alkene, aryl, arylene or organo-functional group. Silsesquioxanes can have a cage-like structure, most commonly in the form of a cube, hexagonal prism, octagonal prism, decagonal prism, dodecagonal prism, or opened cage-like structure. The high three-dimensional symmetry and nanometer size make silsequioxanes building blocks for nanocomposites. The diversity of possible functional groups along with their controlled orientation in three-dimensional space allows for highly tailored nanometer-by-nanometer construction in all three dimensions. Examples of possible silsesquioxanes include, but are not limited to, polyhedral oligosilsesquioxanes (POSS), octasilsesquioxanes of the $[ROSiO_{1.5}]_8$ type and its polymeric derivatives and the $[R\text{-phenyl}SiO_{1.5}]_8$ type and its polymeric derivatives.

As used herein, polysaccharides are polymeric carbohydrate molecules composed of long chains of monosaccharide units bound together by glycosidic linkages. They may range in structure from linear to highly branched. Examples include storage polysaccharides such as starch and glycogen and structural polysaccharides such as cellulose and chitin. Polysaccharides are often quite heterogeneous, containing slight modifications of the repeating unit. Depending on the structure, these macromolecules can have distinct properties from their monosaccharide building blocks. They may be amorphous or even insoluble in water. When all the monosaccharides in a polysaccharide are the same type, the polysaccharide is called a homopolysaccharide or homoglycan, when more than one type of monosaccharide is present they are called heteropolysaccharides or heteroglycans.

Natural saccharides are generally of simple carbohydrates called monosaccharides with the general formula $(CH_2O)_n$, wherein n is three or more. Examples of monosaccharides include glucose, fructose and glyceraldehyde. Polysaccharides, meanwhile have a general formula of $C_x(H_2O)_y$, wherein x is usually a larger number in the range of 100-3000, preferably 200-2500, preferably 500-200. Considering that the repeating units in the polymer backbone are often six carbon monosaccharides, the general formula can also be represented as $(C_6H_{10}O_5)_n$, wherein n is in the range of 10-5000, preferably 20-4000, preferably 40-3000. In general, polysaccharides contain more than ten monosaccharide units. Definitions of how large a carbohydrate must be to fall into the categories of polysaccharides or oligosaccharides may vary.

In terms of the present disclosure, the polysaccharide may be a structure polysaccharide (chitin, arabinoxylans, pectins, cellulose) or a storage polysaccharide (starches, glycogen). Additional exemplary polysaccharides include, but are not limited to, callose, laminarin, chrysolaminarin, xylan, arabinoxylan, mannan, fucoidan and galactomannan. In a preferred embodiment, the polysaccharide comprises starch.

As used herein, starch or amylum is a carbohydrate consisting of a large number of glucose units joined by glycosidic bonds. Starch is a glucose polymer in which glucopyranose units are bonded by alpha linkages. It consists of two types of molecules, the linear and helical amylose and the branched amylopectin. Amylose consists of a linear chain of several hundred glucose molecules and amylopectin is a branched molecule made of several thousand glucose units (approximately every chain of 20-40, preferably 22-35, preferably 24-30 glucose unis is one unit of amylopectin). In a preferred embodiment, the starch of the present disclosure comprises 10-30% amylose by weight relative to the total weight of the starch, preferably 12-28%, preferably 15-25% amylose by weight relative to the total weight of the starch. In a preferred embodiment, the starch of the present disclosure comprises 70-90% amylopectin by weight relative to the total weight of the starch, preferably 72-88%, preferably 75-85% amylopectin by weight relative to the total weight of the starch.

According to its fourth aspect, the present disclosure relates to a nanocomposite film further including a surface of the polysaccharide layer and a surface of the polymer layer. The polysaccharide layer surface has a first resistivity. The polymer layer surface has a second resistivity. Additionally, the second resistivity is less than or equal to the first resistivity.

The nanocomposite film of the present disclosure may have various shapes and sizes. In a preferred embodiment, the nanocomposite film may be horizontally oriented with a longitudinal axis. The polymer layer and polysaccharide layer may be parallel to each other and the longitudinal axis and the longitudinal axis may run through the conductive nanofiller layer sandwiched between and in continuous contact with both the polymer layer and the polysaccharide layer. The polymer layer and the polysaccharide layer may also be opposing across the longitudinal axis and the vertical distance between the polymer layer surface and polysaccharide layer surface may define the thickness of the nanocomposite film. In one embodiment, the film is double sided and the polymer layer surface and polysaccharide layer surface are not adjoining. In terms of the present disclosure, the conductive naofiller layer is oriented parallel to the polymer layer and the polysaccharide layer.

As used herein, "surface" refers to the outermost part or most outside layer or boundary of a material, here the nanocomposite film. It includes both a continuous set of points with length and width providing an exterior face to the nanocomposite and also may have a thickness and depth and be described as a layer. A surface, as used herein, is in complete and continuous contact with an external environment of the nanocomposite film of the present disclosure as well as the nanocomposite film itself. In one embodiment, the nanocomposite film of the present disclosure comprises a first (polysaccharide) and second (polymer) surface. It is further envisaged that the present disclosure may be adapted to incorporate a third surface, a fourth surface, a fifth surface, etc. or a plurality of surfaces with defined content of polymer, polysaccharide and conductive nanofiller and defined electrical resistivity.

As used herein, the conductive nanofiller layer refers to the portion of the nanocomposite that is neither the polymer layer nor the polysaccharide layer. The conductive nanofiller layer may have characteristics of the polymer layer, the polysaccharide layer, both and/or neither. In a preferred embodiment, the polymer layer and the polysaccharide layer form distinct layers with distinct and identifiable interfaces between each layer and the conductive nanofiller layer. In one embodiment, the polymer and polysaccharide layers form distinct layers, although the interface between each layer and the conductive nanofiller layer may be a mixture of both the polymer layer and the conductive nanofiller layer, a mixture of the polysaccharide layer and the conductive nanofiller layer, or a mixture of the polymer layer, the polysaccharide layer and the conductive nanofiller layer. The nanocomposite film described herein is singular comprising a polymer layer, a polysaccharide layer, a conductive nanofiller layer, a polymer layer surface, and a polysaccharide layer surface, and their interfaces. The film is not formed by conjoining multiple films and has no internal film-to-film interfaces.

In one embodiment, the conductive nanofiller layer of the nanocomposite film may have a conductive nanofiller content gradient. Generally, the conductive nanofiller layer will have a content of conductive nanofiller greater than the polymer layer and greater than the polysaccharide layer. In one embodiment, the content of the conductive nanofiller layer may increase at greater distances from the polymer layer and greater distances from the polysaccharide layer. Conversely, the content of conductive nanofiller in the conductive nanofiller layer may decrease at shorter distances from the polymer layer and shorter distances from the polysaccharide layer.

In one embodiment, the nanocomposite film of the present disclosure has a total average thickness of 0.1-1.0 mm, preferably 0.2-0.8 mm, preferably 0.3-0.7 mm, preferably 0.4-0.6 mm or about 0.5 mm.

In one embodiment, the polymer layer of the present disclosure may encompass up to 70% of the total thickness of the nanocomposite film, preferably up to 60%, preferably up to 50%, preferably up to 40%, preferably up to 30%, preferably up to 25%, preferably up to 20%, preferably up to 15%, preferably up to 10%, preferably up to 5% of the total thickness of the naiioeomposite film. In one embodiment, the polymer layer of the present disclosure has a total average thickness of up to 0.5 mm, preferably up to 0.4 mm, preferably up to 0.3 mm, preferably up to 0.25 mm, preferably up to 0.2 mm, preferably up to 0.15 mm, preferably up to 0.1 mm, preferably up to 0.05 mm.

In one embodiment, the polysaccharide layer of the present disclosure may encompass up to 70% of the total thickness of the nanocomposite film, preferably up to 60%, preferably up to 50%, preferably up to 40%, preferably up to 30%, preferably up to 25%, preferably up to 20%, preferably up to 15%, preferably up to 10%, preferably up to 5% of the total thickness of the nanocomposite film. In one embodiment, the polysaccharide layer of the present disclosure has a total average thickness of up to 0.5 mm, preferably up to 0.4 mm, preferably up to 0.3 mm, preferably up to 0.25 mm, preferably up to 0.2 mm, preferably up to 0.15 mm, preferably up to 0.1 mm, preferably up to 0.05 mm.

In one embodiment, the nanocomposite film has up to 25% conductive nanofiller by weight relative to the total weight of the nanocomposite film, preferably up to 20%, preferably up to 15%, preferably up to 10%, preferably up to 9%, preferably up to 8%, preferably up to 7%, preferably up to 6%, preferably up to 5%, preferably up to 4%, preferably up to 3%, preferably up to 2%, preferably up to 1%, preferably up to 0.75%, preferably up to 0.5%, preferably up to 0.25%, preferably up to 0.2%, preferably up to 0.15%, preferably up to 0.1%, preferably up to 0.01%.

In one embodiment, the nanocomposite film is at least 50% polymer by weight relative to the total weight of the nanocomposite film, preferably at least 55%, preferably at least 60%, preferably at least 65%, preferably at least 66%, preferably at least 67%, preferably at least 68%, preferably at least 69%, preferably at least 70%. In one embodiment, the nanocomposite film is at least 20% polysaccharide by weight relative to the total weight of the nanocomposite film, preferably at least 25%, preferably at least 30%, preferably at least 35%, preferably at least 36%, preferably at least 37%, preferably at least 38%, preferably at least 39%, preferably at least 40%. In one embodiment, the nanocomposite film comprises a weight ratio between the polymer and the polysaccharide in the range of 80:20 to 60:40, preferably 75:25 to 65:45, preferably 72:23 to 67:48, or about 70:30.

The mechanical properties of the nanocomposite film of the present disclosure are also of interest. Tensile strength is the maximum stress that a material can withstand while being stretched or pulled before failing or breaking. Young's modulus (tensile modulus, E-modulus or elastic modulus) is a measure of a material's stiffness or its resistance to being deformed elastically (non-permanently) when a force is applied and can be thought of as the ratio of stress to strain. In one embodiment, the nanocomposite film of the present disclosure has a tensile strength in the range of 5-75 MPa, more preferably 10-60 MPa, more preferably 15-50 MPa. The inclusion of conductive nanofiller may increase the tensile strength by at least 20%. In one embodiment, the nanocomposite film of the present disclosure has a Young's modulus in the range of 2-80 MPa, preferably 10-70 MPa, preferably 15-60 MPa, more preferably 20-50 MPa. The inclusion of conductive nanofiller may increase the tensile strength by at least 15%.

In one embodiment, the nanocomposite film comprises from 0.1-10.0% of conductive nanofiller by weight relative to the total weight of the nanocomposite film, preferably 0.25-7.0%, preferably 0.5-5.0%, preferably 1.0-3.0% by weight relative to the total weight of the nanocomposite film. In one embodiment, the nanocomposite film has a polymer layer that is antistatic and a polysaccharide layer that is antistatic. The polymer layer is antistatic and has a second resistivity of $10^4$-$10^8$ ohm·cm$^2$, preferably $10^4$-$10^7$, preferably $10^4$-$10^6$, preferably $10^4$-$7.5 \times 10^5$, preferably $10^4$-$5.0 \times 10^5$, preferably $10^4$-$2.5 \times 10^5$, preferably $10^4$-$10^5$, preferably $10^4$-$0.5 \times 10^5$, preferably $10^4$-$0.25 \times 10^5$ ohm·cm$^2$. The polysaccharide layer is antistatic and has a second resistivity of $10^4$-$10^8$ ohm·cm$^2$, preferably $10^4$-$10^7$, preferably $10^4$-$10^6$, preferably $10^4$-$7.5 \times 10^5$, preferably $10^4$-$5.0 \times 10^5$, preferably $10^4$-$2.5 \times 10^5$, preferably $10^4$-$10^5$, preferably $10^4$-$0.5 \times 10^5$, preferably $10^4$-$0.25 \times 10^5$ ohm·cm$^2$.

According to a fifth aspect, the present disclosure relates to a process for forming the polymer, polysaccharide and conductive nanofiller nanocomposite films of the present disclosure, in one or more of their embodiments.

In a preferred embodiment, the nanocomposite film of the present disclosure is formed by a solution processing or solution mixing and casting technique. The process is described as wet chemistry and is considered simple and cost effective compared to other processes for manufacturing polymer nanocomposites. In general, solution processing refers to the dispersion of conductive nanofiller into a solvent followed by mixing with a polymer solution and a polysaccharide solution and subsequent vaporization of the solvent to form the desired nanocomposite.

In one embodiment, the solution processing begins with dispersion of the conductive nanofiller into a liquid solution by energetic mixing. The certain amount of conductive nanofiller is determined by the desired weight percent of the final nanocomposite. In one embodiment, the ratio of polymer and polysaccharide to conductive nanofiller may be 85:1, 90:1, 93:1, 95:1, 97:1, 99:1, 99.5:1, 99.75:1. This mixing may include, but is not limited to, mechanical mixing, magnetic agitation, mild sonication, high-energy ultrasonication, shear mixing, refluxing and mixtures thereof. The process of mixing to form a stable dispersion may last as little as 2 hours, preferably 1.5 hours, preferably 1 hour, preferably 30 minutes, preferably 15 minutes, preferably 10 minutes, preferably 5 minutes, preferably 2 minutes. In one embodiment, the dispersion of nanofiller may occur directly in a polymeric and polysaccharide solution, in another embodiment the nanofiller is dispersed in a solvent and then mixed with an independent polymer and polysaccharide solution that may be in the same solvent or a different solvent.

In one embodiment, once combined in a reaction mixture the dispersed conductive nanofiller solution and the polymer and polysaccharide solution are further mixed by the means discussed previously, preferably heating, magnetic agitation and ultrasonication, preferably magnetic stirring at a speed of at least 100 rpm, preferably at least 200 rpm, preferably at least 400 rpm. In one embodiment the reaction mixture is mixed at elevated temperature of at least 40° C., preferably at least 60° C., preferably at least 70° C., preferably at least 80° C. Alternatively the reaction mixture is mixed at room temperature, 20-30° C. The process of mixing the reaction mixture may last as little as 6 hours, preferably 4 hours, preferably 2 hours, preferably 1.5 hours, preferably 1 hour, preferably 30 minutes, preferably 15 minutes. In one embodiment, following the mixing the reaction mixture is degassed to remove any traces of air from the solution with inert gas. The process of degassing may last as little as 2 min, preferably 5 min, preferably 10 min, preferably 15 min. Finally, the mixture is poured on a leveled flat surface and allowed to dry at room temperature. The dried films may then be peeled from the surface they were poured and cast on and kept in a desiccator to avoid moisture uptake. In one embodiment, the nanocomposite films are cast and dried in glass plates. In one embodiment, the drying is done at elevated temperature up to 200° C., preferably up to 150° C., preferably up to 100° C., preferably up to 75° C., preferably up to 50° C. The drying time may take up to 48 hours, preferably up to 24 hours, preferably up to 12 hours, preferably up to 8 hours, preferably up to 4 hours, preferably up to 2 hours.

The nature of the conductive nanofiller/polymer/polysaccharide ratio and fabrication conditions including, but not limited to temperatures, sonications, step durations and casting and drying conditions are what allow for control of the size, shape and dispersion of the conductive nanofiller in the nanocomposite film. Thus, variations in the above process give rise to a nanocomposite film comprising a polymer layer, a conductive nanofiller layer and a polysaccharide layer.

In one embodiment, the polymerization by solution processing is carried out in a liquid solvent that may include polar protic solvents, aprotic polar solvents and non-polar solvents. Suitable polar protic solvents may include, but are not limited to, water, nitromethane, and short chain alcohols such as methanol, ethanol, propanol, isopropanol, butanol of the like and mixtures thereof. Suitable aprotic polar solvents may include, but are not limited to, propylene carbonate, ethylene carbonate, butyrolactone, acetonitrile, benzonitrile, nitromethane, nitrobenzene, sulfolane, dimethylformamide, N-methylpyrrolidone or the like and mixtures thereof. Suitable non-polar solvents may include, but are not limited to, cyclohexane, octane, heptane, hexane, benzene, toluene, xylene, methylene chloride, carbon tetrachloride, diethyl ether or the like and mixtures thereof. In one embodiment, co-solvents may also be used. In a most preferred embodiment, the liquid solvent is water or a solution comprising glycerol and water, preferably less than 10% glycerol by weight relative to the total weight of the solution, preferably less than 8% glycerol, preferably less than 6% glycerol, preferably less than 4% glycerol, preferably less than 2% glycerol.

In one embodiment, the reaction mixture of the present process may contain one or more additional additives to change the properties of the nanocomposites and/or to improve the process of producing the nanocomposites. Exemplary additives include, but are not limited to, surfactants, antifoaming agents or defoamers, a scale inhibitor, a corrosion inhibitor, a colorant, a thermal stabilizer, a dopant, a coolant additive, a polymerization catalyst, a hardener, a Lewis base, a plasticizer and mixtures thereof.

In one embodiment, the nanocomposite film may further undergo one or more manufacturing steps after formation to instill any desired properties. Techniques or processes including, but not limited to, vulcanization, grafting, cross-linking, injection molding, hot pressing, drawing, extrusion, autoclaving, annealing, heat treating, sintering, compression molding, machining, welding, adhesively bonding, thermoforming, coating, vacuum forming, blow molding, stretch blow molding, transfer molding, calendaring, compounding, orienting, tape laying with in situ consolidation, diaphragm forming, rotational molding, centrifugal molding, fiber spinning, filament winding, foam blowing, pultruding and the like are considered to be within the scope of the present method.

In another embodiment, the polymer nanocomposite film of the present disclosure is formed by in situ polymerization. In general, the conductive nanofiller and polysaccharide are mixed with monomers or pre-polymers and then the nanocomposite is formed by polymerizing the monomers or pre-polymers. This method may further encompass the use of metallocene-based catalyst, anchoring agents such as methylaluminoxane and/or a hardener. This polymerization process is usually accompanied by a viscosity increase that hinders manipulation and limits load fraction. Additionally, solvents may be necessary and may need to be removed, similarly to solution processing.

In another embodiment, the polymer nanocomposite film of the present disclosure is formed by melt blending. This method is generally applied to polymers that are insoluble and is particularly useful for dealing with thermoplastic polymers. The technique capitalizes on the fact that thermoplastic polymers soften when heated. Amorphous polymers are heated above their glass transition temperature and semi-crystalline polymers are heated above their melt temperature to induce sufficient softening. Conductive nanofiller and polysaccharide can then be mixed into the melt by conventional blending equipment such as shear mixing or a twin screw extruder and bulk samples can be further fabricated by techniques such as compression molding, injection molding, and/or extrusion. In other embodiments, the polymer nanocomposite film of the present disclosure is further envisioned to be produced by novel methods including, but not limited to, solid-state mechanochemical pulverization, coagulation spinning and/or latex fabrication methods.

In a preferred embodiment, the conductive nanofiller is graphene, the polysaccharide is starch and the polymer is polyvinyl alcohol. In one embodiment, the graphene can be prepared from exfoliation of graphite. As used herein, "exfoliation" refers to cleavage or coming apart of a material shed from a surface in scales or layers. The exfoliation may be by mechanical cleavage means such as adhesive tape, shearing or wedge based mechanical exfoliation. The exfoliation may also be by direct sonication cleavage such as solvent-aided sonication, solvent/surfactant aided sonication and immiscible liquid aided sonication. In one embodiment, the graphene can be prepared from graphite oxide or graphene oxide via thermal (~2000° C./s) or chemical (hydrazine) reduction followed by or preceded by exfoliation.

In another embodiment, the graphene may be produced by epitaxy. Epitaxy refers to the deposition of a crystalline overlayer on a crystalline substrate, ideally coupled weakly enough to retain the two dimensional electronic band structure of isolated graphene. Suitable substrates include, but are not limited to silicon carbide, metals such as ruthenium, iridium, nickel or copper. The graphene conductive nanofiller of the present disclosure is envisioned to be produced by a variety of techniques including, but not limited to, the sugar method, sodium ethoxide pyrolysis, roll-to-roll manufacturing, silicon/germanium/hydrogen chemical vapor deposition, nanotube slicing, carbon dioxide reduction, spin coating, supersonic spray, intercalation, $CO_2$ infrared laser, and microwave assisted oxidation.

In another embodiment, the nanocomposite film of the present disclosure may be formed by methods requiring a substrate, typically glass or plastic. Such methods include, but are not limited to chemical vapor deposition (CVD), preferably microwave-assisted CVD, and spin coating.

According to a sixth aspect, the present disclosure relates to an electrical or electronic device including the polymer, polysaccharide and conductive nanofiller nanocomposite films of the present disclosure, in one or more of their embodiments.

In one embodiment, the electrical or electronic device is covered by the nanocomposite film by attaching the freestanding film to the device by any reasonable manner. The nanocomposite may be attached through surface coating interaction (e.g. glued, tacked, cemented, pasted, etc.), attached by highly connected or integral interactions (e.g. melted together, fused, amalgamated, etc.), or sandwiched between a plurality of electronic components of the device. In another embodiment, the electrical or electronic device is covered by the nanocomposite film by first applying the conductive nanofiller/polymer/polysaccharide reaction mixture to the device and then forming the nanocomposite on the device by drying. In another embodiment, the electrical device is covered by, attached to, wrapped or enclosed by a metal or alloy or ceramic substrate on which the nanocomposite is disposed.

In one embodiment, the nanocomposite film of the present disclosure is envisioned to find use as an antistatic agent or electrostatic discharge material. An antistatic agent is a compound used for the treatment of materials or their surfaces in order to reduce or eliminate the buildup of static electricity. The role of the antistatic agent is to make the surface of the material itself slightly conductive. Antistatic devices reduce static electricity that can damage electrical components such as computer hard drives, cause bodily injury, or ignite flammable liquids and gases. Exemplary non-limiting applications of the nanocomposite film as an antistatic agent or component of an antistatic device include, but are not limited to, antistatic bags used to contain devices, such as graphics cards or hard disk drives, often during transport, antistatic garments such as gloves or shoes used in many industries such as electronics, communication, telecommunication and defense applications, antistatic mats, antistatic straps and antistatic bars used to ground many sensitive processes and systems.

In one embodiment, the nanocomposite film of the present disclosure is envisioned to find use as an electromagnetic shielding material. Electromagnetic (EM) shielding is the practice of reducing the electromagnetic field in a space by blocking the field with barriers made of conductive materials. Shielding is typically applied to enclosures for isolating electronic devices from the "outside world" and cables to isolate wire from the environment through which the cable runs. The nanocomposite film of the present disclosure may completely enclose an electronic product or a portion of that product and prevent the EM emission from an outside source from deteriorating its electronic performance. Conversely, it may also be used to prevent an external susceptible (electronic items or living organisms) from internal emissions of an instruments' electronic circuitry. In one embodiment, the nanocomposite film of the present invention may be applied to plastics comprising sensitive electronic devices.

Exemplary non-limiting applications of the nanocomposite film as an electromagnetic shielding material include, but are not limited to, an EM shielding gasket, a shielded cable, protection of medical, laboratory and defense equipment from interfering signals including AM, FM, TV, emergency services, dispatch, pagers, cellular, ESMR and PCS, protection for computers and keyboards to prevent passive monitoring, and protection of secure data stored on RFID chips embedded in many devices.

The examples below are intended to further illustrate protocols for preparing and characterizing the nanocomposite films of the present disclosure described herein. Further, they are intended to illustrate assessing the morphology and electrical properties of these nanocomposite films, specifically resistivity. They are not intended to limit the scope of the claims.

Example 1

Chemicals

Polyvinyl alcohol (PVA) was purchased from Sigma Aldrich Company and utilized directly without further purification. Millipor MilliQ purified deionized water was used in all operations. Multiwall carbon nanotubes were procured from Nanostructure and Amorphous Material, Inc., USA and utilized directly without any further purification. Starch was obtained from ARASCO Corn products, Dammam, Saudi Arabia and utilized directly without any further purification. Graphene (Grafen®-iGP) of 96-99% purity was procured from Grafen Chemical Industries Co., Turkey and utilized directly without any further treatment or purification in the embodiments described herein.

Example 2

Preparation of Polyvinyl Alcohol (PVA) and Carbon Nanotube (CNT) Nanocomposite Blends Blends of polyvinyl alcohol (PVA) and carbon nanotubes (CNT) were prepared via a solution mixing and evaporative casting method. First of all, 3 g of PVA was completely dissolved in deionized water (40 mL) at 98° C. under 600 rpm. Subsequently, a certain amount of carbon nanotubes, based on the formulations as shown in Table 1, was added to 35 mL of deionized water.

TABLE 1

Formulations used in preparing the polyvinyl alcohol and carbon nanotube blends

| Sample | Amount of carbon nanotubes (g) |
|---|---|
| PVA (control) | — |
| PVA/CNT (0.5 wt. %) | 0.015 |
| PVA/CNT (1.0 wt. %) | 0.03 |
| PVA/CNT (3.0 wt. %) | 0.09 |
| PVA/CNT (5.0 wt. %) | 0.15 |
| PVA/CNT (7.0 wt. %) | 0.21 |
| PVA/CNT (10.0 wt. %) | 0.30 |

A stable dispersion of carbon nanotubes in water was prepared by ultra-sonication using the Ultrasonicator Probe (Ultrasonica Q 700) at an amplitude of 30% for 15 minutes. After that, the dispersion of water and carbon nanotubes was added to the PVA solution in water and stirring was continued for one hour with the use of a magnetic stirrer at 600 rpm and at a temperature of 80° C. The mixture was then degassed for 10 minutes to remove any traces of air from the solution. Finally, the mixture was poured into a plastic Petri dish placed on a leveled flat surface and allowed to dry at room temperature for six days. The dried films of approximately 0.5 mm in thickness were carefully peeled off from the plastic Petri dish and kept in a desiccator to avoid moisture uptake.

Example 3

Characterization of Polyvinyl Alcohol (PVA) and Carbon Nanotube (CNT) Nanocomposite Blends Field emission scanning electron microscopy (FESEM) images were taken using MIRA3 TESCAN field emission SEM. The samples were cryo-fractured using liquid nitrogen before testing. The cross section of samples was coated with platinum (5 nm thickness) to make the surface conductive. The electrical resistances of the samples were measured using a digital source meter (Model 2400 Series, Keithley Instruments, Inc.). The calculated results of the electrical resistivity are reported in Table 2.

TABLE 2

Resistance measurements of polyvinyl alcohol and carbon nanotube blends

| Sample | Surface Resistivity ($\Omega \cdot cm^2$) Second Surface | Surface Resistivity ($\Omega \cdot cm^2$) First Surface |
|---|---|---|
| PVA (control) | >2.00 × 10$^8$ | >2.00 × 10$^8$ |
| PVA/CNT (0.5 wt. %) | >2.00 × 10$^8$ | >2.00 × 10$^8$ |
| PVA/CNT (1.0 wt. %) | 5.67 × 10$^7$ | >2.00 × 10$^8$ |
| PVA/CNT (3.0 wt. %) | 3.44 × 10$^5$ | >2.00 × 10$^8$ |
| PVA/CNT (5.0 wt. %) | 1.27 × 10$^6$ | >2.00 × 10$^8$ |
| PVA/CNT (7.0 wt. %) | 7.35 × 10$^4$ | 8.11 × 10$^7$ |
| PVA/CNT (10.0 wt. %) | 3.05 × 10$^3$ | 1.02 × 10$^8$ |

Figure 1B:
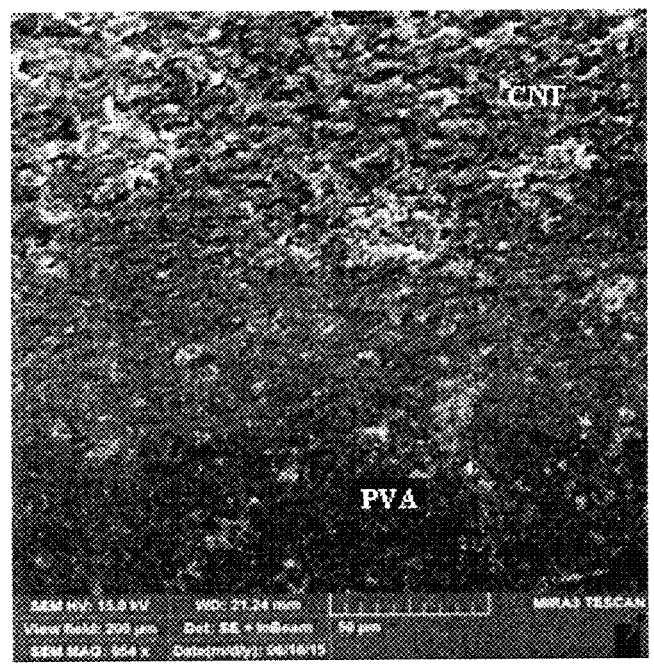
FIG. 1B is a FESEM image of the prepared polyvinyl alcohol and carbon nanotube nanocomposite film comprising 7.0 weight percent of carbon nanotubes relative to the total weight of the nanocomposite film.
Figure 1C:
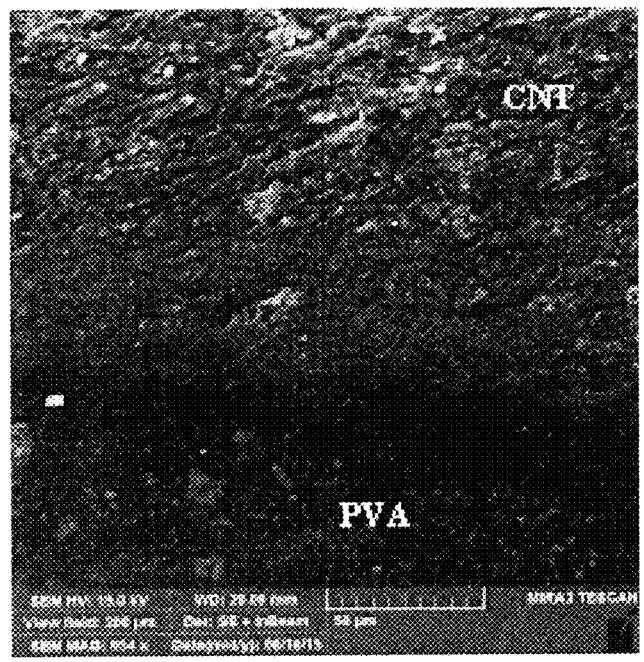
FIG. 1C is a FESEM image of the prepared polyvinyl alcohol and carbon nanotube nanocomposite film comprising 10.0 weight percent of carbon nanotubes relative to the total weight of the nanocomposite film.

FIG. 1A, FIG. 1B and FIG. 1C show scanning electron micrographs of pure PVA film (FIG. 1A), PVA/CNT (7%) (FIG. 1B), and PVA/CNT (10%) (FIG. 1C). Pure PVA film demonstrated one homogeneous phase (FIG. 1A), while the PVA/CNT nanocomposite films demonstrated by FESEM two phases (layers) were formed (FIG. 1B and FIG. 1C). One phase was rich with carbon nanotubes and the other contained little to no carbon nanotube content. At high loadings of carbon nanotubes, there was a clear distinction between the PVA and carbon nanotube phases.

The effect of carbon nanotube loading on the electrical surface resistivity of PVA/CNT bio-nanocomposites is reported in Table 2. The surface resistivity has been presented for both surfaces of the film, where the first surface has been considered as an "upper" surface and the other second surface as a "bottom" surface relative to and depending on location at the time of casting the nanocomposite film. Interestingly, there is a great difference in surface resistivity between the second and first surface of the films, especially in those with a high content of carbon nanotubes. The surface resistivity of the first surface falls under insulating at all loadings of carbon nanotubes, indicating that this surface is insulating in nature. However, the electrical surface resistivity of the second surface is found to decrease with increasing carbon nanotube loading in the nanocomposite. It is seen that the resistivity of the composites transitions from the insulating region (10$^8$ ohm·cm$^2$ to 10$^{17}$ ohm·cm$^2$) to the semiconductive/conductive region (below 10$^4$ ohm·cm$^2$) through the antistatic region (10$^4$ ohm·cm$^2$ to 10$^8$ ohm·cm$^2$) depending on the loading of carbon nanotubes.

Thus, depending on the carbon nanotube loading one can generate composites with insulating-insulating surface (PVA control and 0.5 wt % carbon nanotube composite), insulating-antistatic surfaces (1.0 wt %, 3.0 wt %, 5.0 wt % and 7.0 wt % carbon nanotube composites) and insulating-semiconductive/conductive surfaces (10.0 wt % carbon nanotube composite). These types of composites have practical value due to their applicability in different electrical and electronic fields. The advantage of using these insulating-semiconducting materials is that they minimize the risk of an electrical shock due to one surface being insulating in nature.

Example 4

Preparation of Polyvinyl Alcohol (PVA), Graphene, and Starch Nanocomposite Blends Nanocomposites of polyvinyl alcohol (PVA), graphene and starch were prepared via a solution mixing and evaporative casting method. The ratio between PVA and starch was kept constant at 70/30 (parts by weight). First of all, 4.2 g of PVA was completely dissolved in deionized water (50 mL) at 98° C. under stirring at 600 rpm. Next, 1.8 g of starch and 3.0 g of glycerol were mixed with deionized water (50 mL) at 8° C. under stirring at 400 rpm for 30 minutes. Subsequently, certain amounts of graphene, based on the compositions shown in Table 3, were added to 50 mL of deionized water.

TABLE 3

Formulations used in preparing the polyvinyl alcohol, graphene, and starch nanocomposite blends

| Sample | Graphene (wt. %) | Amount of graphene (g) |
|---|---|---|
| PVA/S (control) | 0.0 | — |
| PVA/G/S (0.25 wt. %) | 0.25 | 0.015 |
| PVA/G/S (0.5 wt. %) | 0.5 | 0.03 |
| PVA/G/S (1.0 wt. %) | 1.0 | 0.06 |
| PVA/G/S (3.0 wt. %) | 3.0 | 0.18 |
| PVA/G/S (5.0 wt. %) | 5.0 | 0.30 |
| PVA/G/S (7.0 wt. %) | 7.0 | 0.42 |
| PVA/G/S (10.0 wt. %) | 10.0 | 0.60 |

Stable dispersions of graphene in deionized water were prepared by ultra-sonication using the Ultrasonicator Probe (Ultrasonica Q 700) at an amplitude of 30% for 2 minutes. After that, the dispersions of starch and graphene were added to the PVA solution. The whole mixture was continuously stirred at 400 rpm for 4 hours. The mixture was then degassed for 10 minutes to remove any traces of air from the solution. Finally, the mixture was poured into a glass plate placed on a leveled flat surface and kept for drying at 50° C. in an air oven for 24 hours. The dried films of approximately 0.3 mm in thickness were carefully peeled off from the plates and preserved in a desiccator filled with silica gel to avoid the absorption of any moisture.

Example 5

Characterization of Polyvinyl Alcohol (PVA), Graphene, and Starch Nanocomposite Blends Field emission scanning electron microscopy (FESEM) images were taken using MIRA3 TESCAN field emission SEM. The samples were cryo-fractured using liquid nitrogen before testing. The cross section of samples was coated with platinum (5 nm thickness) to make the surface conductive. The electrical resistances of the samples were measured using a digital source meter (Model 2400 Series, Keithley Instruments, Inc.). The calculated results of the electrical resistivity are reported in Table 4.

TABLE 4

Resistance measurements of polyvinyl alcohol, graphene and starch nanocomposite blends

| Sample | Surface Resistivity ($\Omega \cdot cm^2$) PVA Layer Surface | Surface Resistivity ($\Omega \cdot cm^2$) Starch Layer Surface |
|---|---|---|
| PVA (control) | 2.0 × 10$^7$ | 2.3 × 10$^7$ |
| PVA/G/S (0.25 wt. %) | 1.7 × 10$^7$ | 2.4 × 10$^7$ |
| PVA/G/S (0.5 wt. %) | 2.2 × 10$^7$ | 2.2 × 10$^7$ |
| PVA/G/S (1.0 wt. %) | 1.8 × 10$^7$ | 2.5 × 10$^7$ |
| PVA/G/S (3.0 wt. %) | 6.9 × 10$^6$ | 7.7 × 10$^6$ |
| PVA/G/S (5.0 wt. %) | 5.5 × 10$^6$ | 1.1 × 10$^7$ |
| PVA/G/S (7.0 wt. %) | 4.7 × 10$^6$ | 8.9 × 10$^6$ |
| PVA/G/S (10.0 wt. %) | 3.4 × 10$^6$ | 1.2 × 10$^7$ |

Figure 2A:
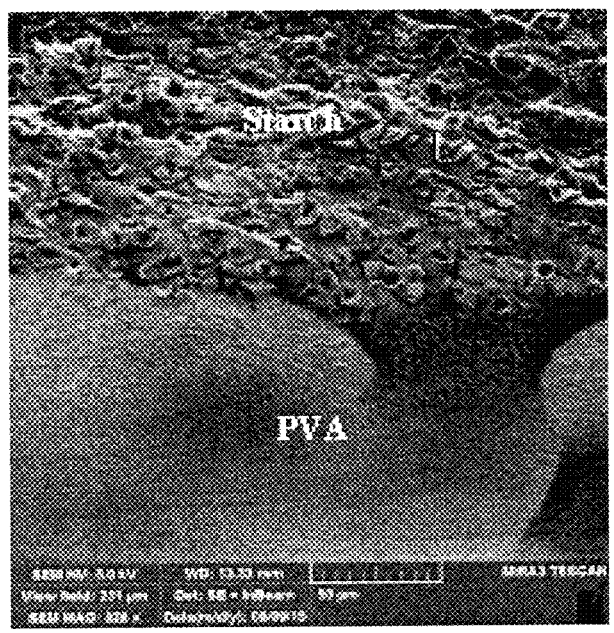
FIG. 2A is a FESEM image of a control pure polyvinyl alcohol (PVA) and starch blend film.
Figure 2B:
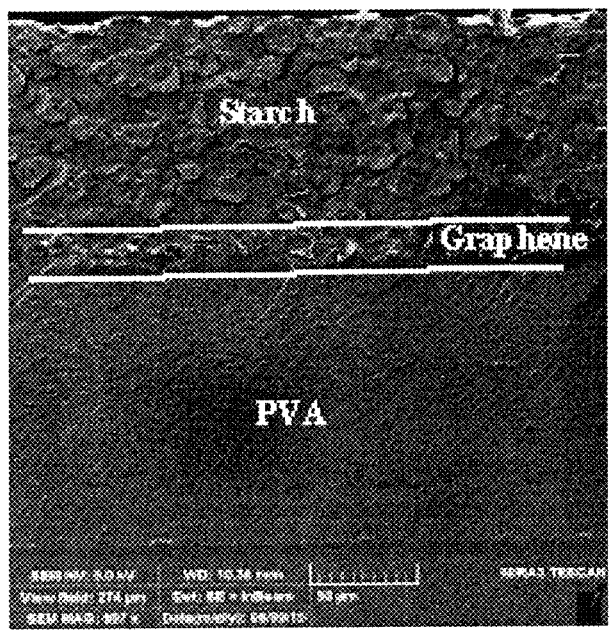
FIG. 2B is a FESEM image of the prepared polyvinyl alcohol, starch and graphene nanocomposite film comprising 1.0 weight percent of graphene relative to the total weight of the nanocomposite film.
Figure 2C:
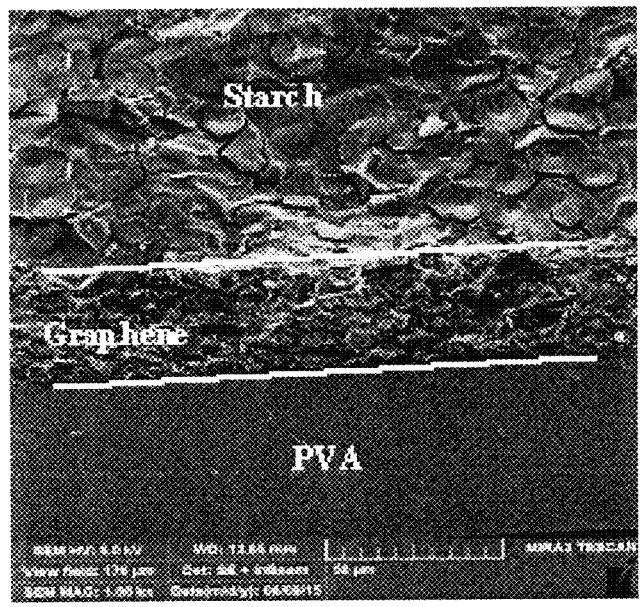
FIG. 2C is a FESEM image of the prepared polyvinyl alcohol, starch and graphene nanocomposite film comprising 5.0 weight percent of graphene relative to the total weight of the nanocomposite film.

FIG. 2A, FIG. 2B and FIG. 2C show scanning electron micrographs of the PVA/Starch blend film (FIG. 2A) and PVA/Grpahene/Starch nanocomposite blends. In the case of the PVA and starch blend, there are two phases formed (FIG. 2A). However, in the case of the PVA/Graphene/Starch nanocomposite blends there are three phases formed of, distinctly PVA, graphene and starch (FIG. 2B and FIG. 2C). The graphene phase was formed between the PVA and starch. The thickness of the graphene layer depends on the amount of graphene in the samples. It increased with increasing graphene content as shown in FIG. 2C.

The electrical surface resistivities for the PVA/Starch blend and PVA/Starch/Graphene nanocomposite blends are presented in Table 4. The surface resistivities for both surfaces of the PVA/Starch and PVA/Graphene/Starch films have been reported in Table 4. Based on the casting of the film, the starch layer surface has been considered as an "upper" surface and the other PVA layer surface as a "bottom" surface. It is clear that the surface resistivities of the upper starch layer surface and bottom PVA layer surface of all the prepared films fall within the antistatic zone ($10^8$ ohm·cm$^2$ to $10^4$ ohm·cm$^2$). The semiconductive/conductive layer of graphene is sandwiched between the polyvinyl alcohol and starch layers.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A nanocomposite film, the nanocomposite film formed by a process comprising:
   hydrolyzing a polyvinyl acetate polymer to form a polyvinyl alcohol polymer,
   preparing a mixture by dispersing the polyvinyl alcohol polymer, a conductive nanofiller, and a cellulose polysaccharide into water;
   casting the mixture to form a casted composition having a polymer phase, a conductive nanofiller phase, and a polysaccharide phase, whereby during the casting, the mixture separates into the polymer phase, the conductive nanofiller phase, and the polysaccharide phase:
   wherein the conductive nanofiller phase is sandwiched between and in continuous contact with the polymer phase and the polysaccharide phase,
   wherein the polymer phase contains a majority of the polyvinyl alcohol polymer in the casted composition,
   wherein the conductive nanofiller phase contains a majority of the conductive nanofiller in the casted composition, and
   wherein the polysaccharide phase contains a majority of the cellulose polysaccharide in the casted composition; and
   drying the casted composition to form the nanocomposite film having a polymer layer, a conductive nanofiller layer, and a polysaccharide layer, wherein the polymer layer, the conductive nanofiller layer, and the polysaccharide layer are respectively formed from the drying of the polymer phase, the conductive nanofiller phase, and the polysaccharide phase:
   wherein a surface of the polysaccharide layer has a first product of electrical resistance and area, R·A,
   wherein a surface of the polymer layer has a second product of electrical resistance and area, R·A, and
   wherein the second R·A is less than or equal to the first R·A.

2. The nanocomposite film of claim 1, wherein the nanocomposite film comprises a weight ratio between the polymer layer and the polysaccharide layer is in the range of 80:20 to 60:40.

3. The nanocomposite film of claim 1, wherein the nanocomposite film comprises up to 25 weight percent of the conductive nanofiller layer relative to the total weight of the nanocomposite film.

4. The nanocomposite film of claim 1, wherein the conductive nanofiller is graphene in the form of nanosheets having an average longest dimension of 1-75 μm and an average thickness of 0.5-300 nm or in the form of nanoplatelets having an average diameter of 1-75 μm and an average thickness of 0.5-300 nm.

5. The nanocomposite film of claim 1, wherein the nanocomposite film has an average thickness of 0.1-1.0 mm.

6. The nanocomposite film of claim 1, wherein the surface of the polysaccharide layer is antistatic and has a first R·A in the range of $10^6$-$10^8$ ohm·cm$^2$ and the surface of the polymer layer is antistatic and has a second R·A in the range of $10^6$-$10^8$ ohm·cm$^2$.

7. An electronic device comprising the nanocomposite film of claim 1, wherein the nanocomposite film is present in or on said electronic device.

* * * * *